US007744466B2

(12) United States Patent
Yoshinobu et al.

(10) Patent No.: US 7,744,466 B2
(45) Date of Patent: Jun. 29, 2010

(54) STORAGE MEDIUM STORING A GAME PROGRAM, GAME APPARATUS AND GAME CONTROLLING METHOD

(75) Inventors: Tomoaki Yoshinobu, Kyoto (JP); Hideki Fujii, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 577 days.

(21) Appl. No.: 11/634,225

(22) Filed: Dec. 6, 2006

(65) Prior Publication Data

US 2008/0076498 A1 Mar. 27, 2008

(30) Foreign Application Priority Data

Sep. 12, 2006  (JP) ............... 2006-246235

(51) Int. Cl.
*G06F 17/00* (2006.01)
(52) U.S. Cl. ...................................... 463/35
(58) Field of Classification Search ............. 463/32–35, 463/40–42
See application file for complete search history.

(56) References Cited

U.S. PATENT DOCUMENTS 5,358,259 A * 10/1994 Best ........................... 463/31
5,393,073 A * 2/1995 Best ........................... 463/35
7,347,780 B1 * 3/2008 Best ........................... 463/37
2004/0127284 A1 * 7/2004 Walker et al. ................. 463/30
2004/0180720 A1 * 9/2004 Nashi et al. .................. 463/37
2006/0148551 A1 * 7/2006 Walker et al. ................. 463/16
2008/0119273 A1 * 5/2008 Yamada et al. ............... 463/39
2008/0248848 A1 * 10/2008 Rippy et al. ................... 463/9

FOREIGN PATENT DOCUMENTS

JP    2005-245927    9/2005

* cited by examiner

*Primary Examiner*—Ronald Laneau
(74) *Attorney, Agent, or Firm*—Nixon & Vanderhye P.C.

(57) ABSTRACT

A video game apparatus includes a CPU, and the CPU advances a game according to input data transmitted from a plurality of controllers. A plurality of players share each controller to utilize it in turn. Each player selects in advance a character as his or her own avatar. When a certain player's (Designation: Mr. or Ms. kk) turn has come, a voice message for urging the change like the following is output from the speaker of the controller: "Take places with Mr. or Ms. kk!" Similarly, when the next turn is a relevant player, and the player directly before finishes playing, a voice message for urging a preparation like the following is output: "Mr. or Ms. kk, prepare for your turn."

19 Claims, 18 Drawing Sheets

FIG. 11

(A) CHARACTER DATA   92e

| CHARACTER ID | IMAGE DATA DESIGNATION DATA |
|---|---|
| A | —————— |
| B | —————— |
| C | —————— |
| D | —————— |
| E | —————— |
| F | —————— |
| G | —————— |
| H | —————— |
| ⋮ | ⋮ |

(B) CONTROLLER ID DATA   92f

| CONTROLLER ID | CONTROLLER (MAC ADDRESS) |
|---|---|
| I | ——————— |
| II | ——————— |
| III | ——————— |
| IV | ——————— |

FIG. 12

(A) CONTROLLER ASSIGNMENT DATA  92g

| CONTROLLER ID | CHARACTER ID | THE NUMBER OF SELECTIONS |
|---|---|---|
| I | A, D, E, G | 4 |
| II | B, C, F, H | 4 |
| III | ⋮ | ⋮ |
| IV | ⋮ | ⋮ |

(B) TIMER MEMORY AREA  94

| CONTROLLER ID | TIMER |
|---|---|
| I | FIRST TIMER |
| II | SECOND TIMER |
| III | THIRD TIMER |
| IV | FOURTH TIMER |

FIG. 13

(A) CORRECT ANSWER COUNT COUNTER MEMORY AREA  96

| CONTROLLER ID | CORRECT ANSWER COUNT COUNTER |
|---|---|
| I | FIRST CORRECT ANSWER COUNT COUNTER |
| II | SECOND CORRECT ANSWER COUNT COUNTER |
| III | THIRD CORRECT ANSWER COUNT COUNTER |
| IV | FOURTH CORRECT ANSWER COUNT COUNTER |

(B) PLAYER NUMBER COUNTER MEMORY AREA  98

| CONTROLLER ID | PLAYER NUMBER COUNTER |
|---|---|
| I | FIRST PLAYER NUMBER COUNTER |
| II | SECOND PLAYER NUMBER COUNTER |
| III | THIRD PLAYER NUMBER COUNTER |
| IV | FOURTH PLAYER NUMBER COUNTER |

STORAGE MEDIUM STORING A GAME PROGRAM, GAME APPARATUS AND GAME CONTROLLING METHOD

CROSS REFERENCE OF RELATED APPLICATION

The disclosure of Japanese Patent Application No. 2006-246235 is incorporated herein by reference.

BACKGROUND OF THE INVENTION

1. Field of the Invention

The present invention relates to a storage medium storing a game program, a game apparatus, and a game controlling method. More specifically, the present invention relates to a storage medium storing a game program, a game apparatus, and a game controlling method capable of playing a game by allowing a plurality of players to take turns using a controller with a speaker.

2. Description of the Related Art

An example of this kind of a game apparatus of the related art is disclosed in a Japanese Patent Laying-open No. 2005-245927 [A63F 13/10, A63F 13/00, A63F 13/12] laid-open on Sep. 15, 2005. According to the game system of the related art, a game console is connected with a plurality of hand-held type game apparatuses and a monitor. In the game console, a turn-based game is executed, and its game screen is displayed on the monitor. The player who waits his or her turn in the turn-based game plays a single-person game with the use of a hand-held type game apparatus, and its game screen is displayed on an LCD of the hand-held type game apparatus. When his or her turn is notified, the player who uses the relevant hand-held type game apparatus performs an operation of the turn-based game.

However, in the game system described in the related art, the turn is notified to the player through the hand-held type game apparatus by a message or sound or the both, wand therefore, when a plurality of players intend to share one controller, the players cannot know to which player the notification is sent, causing a problem of making it impossible to smoothly playing the game.

SUMMARY OF THE INVENTION

Therefore, the present invention may be embodied as a novel storage medium storing a game program, game apparatus, and game controlling method.

The present invention may also be embodied to provide a storage medium storing a game program, a game apparatus, and a game controlling method which can enjoy smoothly playing a game even if a plurality of players use a controller.

It should be noted that the reference numerals inside the parentheses, supplement, etc. only show one example of a correspondence with the embodiment to be described later in order to aid the understanding of the present invention, and do not limit the present invention.

A storage medium storing a game program according to an embodiment of the present invention stores a game program executed in a computer of a game apparatus to allow a plurality of players to play a game by taking turns using a controller furnished with a speaker for outputting a voice message according to a voice message signal. The game program causes the computer to execute a designation storing step, a situation storing step, a message creating step, and a message transmitting step. The designation storing step stores a designation of each of the plurality of players who use the controller by bringing them into correspondence with the controller. The situation storing step stores situation data relating to progressing of the game of each player. The message creating step, when the situation data stored by the situation storing step shows a predetermined state, creates a voice message signal including a designation corresponding to the situation data by utilizing the designation of the player stored in the designation storing step. The message transmitting step transmits the voice message signal created by the message creating step to the controller.

More specifically, the game apparatus (12) can play a game by allowing a plurality of players to take turns using a controller (22) furnished with a speaker (86) for outputting a voice message according to a voice message signal. The game program causes a computer to execute a designation storing step (36, 40, 92g, S29), a situation storing step (36, 40, 94, 96, 98, S59, S61, S123), a message creating step (36, S89, S105, S121), and a message transmitting step (36, S91). The designation storing step stores a designation of each of the plurality of players who uses the controller by bringing them into correspondence with the controller. It should be noted that the designation of the player includes a designation of the character selected by a player in the game as an avatar as well as a name of the player. The situation storing step stores situation data relating to progressing of the game of each player. For example, in a case of a game in which a plurality of players who use a controller make answers to the predetermined questions, a time spent for one question by a certain player and a player's order are stored. The message creating step, when the situation data stored by the situation storing step shows a predetermined state, creates a voice message signal including a designation of the player corresponding to the situation data by utilizing the designation of the player stored in the designation storing step. The message transmitting step transmits the voice message signal created by the message creating step to the controller. Thus, the controller receives the voice message signal, and outputs a voice message according thereto from the speaker. That is, a voice message is notified to the relevant player.

In an embodiment of the present invention, a voice message including a designation of the player is output from the controller, even if a controller is shared by a plurality of players, it is possible to easily know that a voice message is output to which player. Thus, it is possible to smoothly enjoy playing the game.

In one embodiment of the present invention, the game apparatus has a plurality of controllers, the designation storing step stores designations of a plurality of players who use each of the plurality of controllers by bringing them into correspondence with each of the controller, and the message transmitting step transmits the voice message signal created by the message creating step to the controller utilized by a player corresponding to the situation data showing the predetermined state. More specifically, the game apparatus is connected with a plurality of controllers. Thus, the designation storing step stores designations of a plurality of players who use each of the plurality of controllers by bringing them into correspondence with each of the controller. Accordingly, the message transmitting step transmits the voice message signal created by the message creating step to the controller utilized by a player corresponding to the situation data showing the predetermined state. That is, a voice message is notified to the player to which the voice message is to be transmitted. Thus, even if each of the plurality of controllers is utilized by a plurality of players, it is possible to appropriately transmit the voice message.

In one embodiment of the present invention, the predetermined state includes a first situation in which a play time by the same player exceeds a predetermined time. More specifically, when the situation data indicates the first situation in which the play time of the same player exceeds a constant time, a voice message signal of the content, such as encouraging (urging) the player is created, for example, and transmitted to the controller the relevant player utilizes. That is, it is possible to appropriately notify the voice message depending on the progressing of the game by the player to the relevant player.

In another embodiment of the present invention, the predetermined state includes a second situation in which a next player's turn is being to come. More specifically, when the situation data indicates the second situation in which a next player's turn is being to come, a voice message signal of the content such as urging the next player to prepare for the game, for example, is created, and transmitted to the controller utilized by the player. That is, similarly to the above-described embodiment(s) of the invention, it is possible to appropriately notify the voice message depending on the progressing of the game by the player to the relevant player.

In the other embodiment of the present invention, the predetermined state includes a third situation in which a next player's turn has come. More specifically, when the situation data indicates the third situation in which a next player's turn has come, a voice message signal of the content such as prompting the current player to change with the next player, for example, is created, and transmitted to the controller utilized by the relevant player. In this embodiment of the invention, it is possible to appropriately notify the voice message depending on the progressing of the game by the player to the relevant player.

A game apparatus according to an embodiment of the present invention is to play a game by taking turns using a controller furnished with a speaker for outputting a voice message according to a voice message signal. The game apparatus comprises a designation storing means, a situation storing means, a message creating means, and a message transmitting means. The designation storing means stores in a storage means designations of the plurality of players who use the controller by bringing them into correspondence with the controller. The situation storing means stores situation data relating to progressing of the game of each player in the storage means. The message creating means, when the situation data stored by the situation storing means shows a predetermined state, creates a voice message signal including a designation of the player corresponding to the situation data by utilizing the designation of the player stored in the designation storing means. The message transmitting means transmits the voice message signal created by the message creating means to the controller. The controller receives the voice message signal received by the message transmitting means, and outputs a voice message according to the voice message signal from the speaker.

In an embodiment of the invention of the game apparatus also, it is possible to smoothly play a game similarly to the above-described invention of the storage medium.

A game controlling method according to an embodiment of the present invention is a game controlling method of a game apparatus allowing a plurality of players to play a game by taking turns using a controller furnished with a speaker for outputting a voice message according to a voice message signal, including following steps of: (a) storing a designation of the plurality of players who use the controller by bringing them into correspondence with the controller, (b) storing situation data relating to progressing of the game of each player, (c) creating, when the situation data stored by the step (b) shows a predetermined state, a voice message signal including a designation corresponding to the situation data by utilizing the designation of the player stored by the step (a), (d) transmitting the voice message signal created by the step (c) to the controller, and (e) receiving the voice message signal transmitted by the step (d) and outputting a voice message according to the voice message signal from the speaker, by the controller.

In an embodiment of the invention of the game controlling method, similarly to the above-described invention of the storage medium, it is possible to smoothly enjoy playing the game.

The above described objects and other objects, features, aspects and advantages of various embodiments of the present invention will become more apparent from the following detailed description of an embodiment(s) of the present invention when taken in conjunction with the accompanying drawings.

BRIEF DESCRIPTION OF THE DRAWINGS

FIG. 11 is an illustrative view showing one example of character data and one example of controller ID data;

FIG. 12 is an illustrative view showing one example of controller assignment data and one example of a timer memory area;

FIG. 13 is an illustrative view showing one example of a correct answer count counter memory area and one example of a player number counter memory area;

DETAILED DESCRIPTION OF THE PREFERRED EMBODIMENTS

Figure 1:
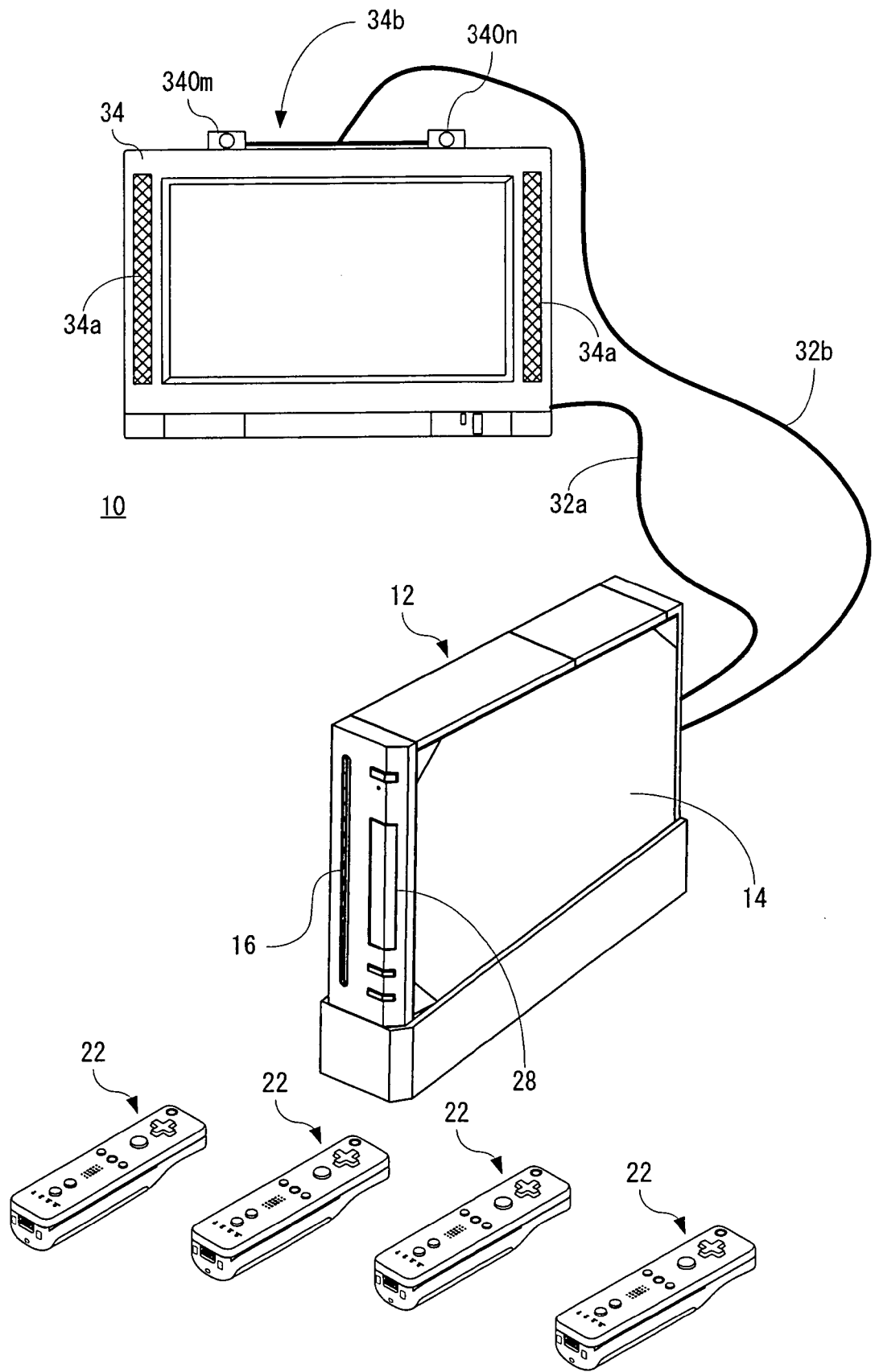
FIG. 1 is an illustrative view showing one embodiment of a game system of the present invention.

Referring to FIG. 1, a game system 10 of one embodiment of the present invention includes a video game apparatus 12 and a controller 22. Additionally, in this embodiment, the video game apparatus 12 is designed so as to be communicably connectable with a maximum of four controllers 22. Also, the video game apparatus 12 and each of the controllers 22 are connected by radio. For example, wireless communication is executed according to Bluetooth (registered trademark) standard, and may be executed by other standards, such as infrared rays and wireless LAN.

In this embodiment, according to this embodiment, radio communication is performed between the video game apparatus 12 and the controller 22, and therefore it is not originally preferable to use the term, "connection". However, as the term expressing a connected state capable of communicating between the video game apparatus 12 and the controller 22, the term for the cable communication is borrowed and the term "connection" is therefore used for convenience.

The video game apparatus 12 includes a roughly rectangular parallelepiped housing 14, and the housing 14 is provided with a disk slot 16 on a front surface. An optical disk 18 (see FIG. 2) as one example of an information storage medium storing game program, etc. is inserted into the disk slot 16 to be loaded in a disk drive 68 (see FIG. 2) within the housing 14.

On the front surface of the housing 14 of the video game apparatus 12 and near the disk slot 16 is provided a memory card slot cover 28. Inside the memory card slot cover 28, a memory card slot (not illustrated) is provided into which an external memory card (hereinafter, simply referred to as "memory card") 30 (see FIG. 2) is inserted. The memory card 30 is employed for loading the game program, etc. read from the optical disk 18 to temporarily store it, storing (saving) game data (result data or proceeding data of the game) of the game played by means of the game system 10, and so forth. It should be noted that storing the game data described above may be performed, in place of the memory card 30, on an internal memory by providing the internal memory, such as a flash memory, etc. inside the video game apparatus 12.

The video game apparatus 12 has an AV cable connector (not illustrated) on the rear surface of the housing 14, and by utilizing the connector, a monitor 34 is connected to the video game apparatus 12 via an AV cable 32a. The monitor 34 is typically a color television receiver, and the AV cable 32a inputs a video signal from the video game apparatus 12 to a video input terminal of the color television, and inputs a sound signal to a sound input terminal. Accordingly, a game image of a three-dimensional (3D) video game, for example, is displayed on the screen of the color television (monitor) 34, and stereo game sound, such as a game music, a sound effect, etc. is output from right and left speakers 34a.

Additionally, around the monitor 34 (upper side in this embodiment), a sensor bar 34b is provided, and the sensor bar 34b is provided with two LED modules (hereinafter referred to as "marker") 340m and 340n. Each of the markers 340m and 340n is an infrared LED, and outputs infrared light toward the front of the monitor 34. A cable 32b extending from the sensor bar 34b is connected to a connector (not illustrated) on a rear surface of the video game apparatus 12, and a power is supplied to the markers 340m and 340n from the video game apparatus 12.

Furthermore, the power of the video game apparatus 12 is applied by means of a general AC adapter (not illustrated). The AC adapter is inserted into a standard wall socket for home use, and the video game apparatus 12 transforms the house current (commercial power supply) to a low DC voltage signal suitable for driving. In another embodiment, a battery may be utilized as a power supply.

In the game system 10, a user or a player turns the power of the video game apparatus 12 on for playing the game (or other applications). Then, the user selects an appropriate optical disk 18 storing a video game (or other applications the player wants to play), and loads the optical disk 18 on the disk drive 68 of the video game apparatus 12 through the disk slot 16. In response thereto, the video game apparatus 12 starts to execute a video game or other applications on the basis of the software stored in the optical disk 18. The user operates the controller 22 in order to apply an input to the video game apparatus 12.

Figure 2:
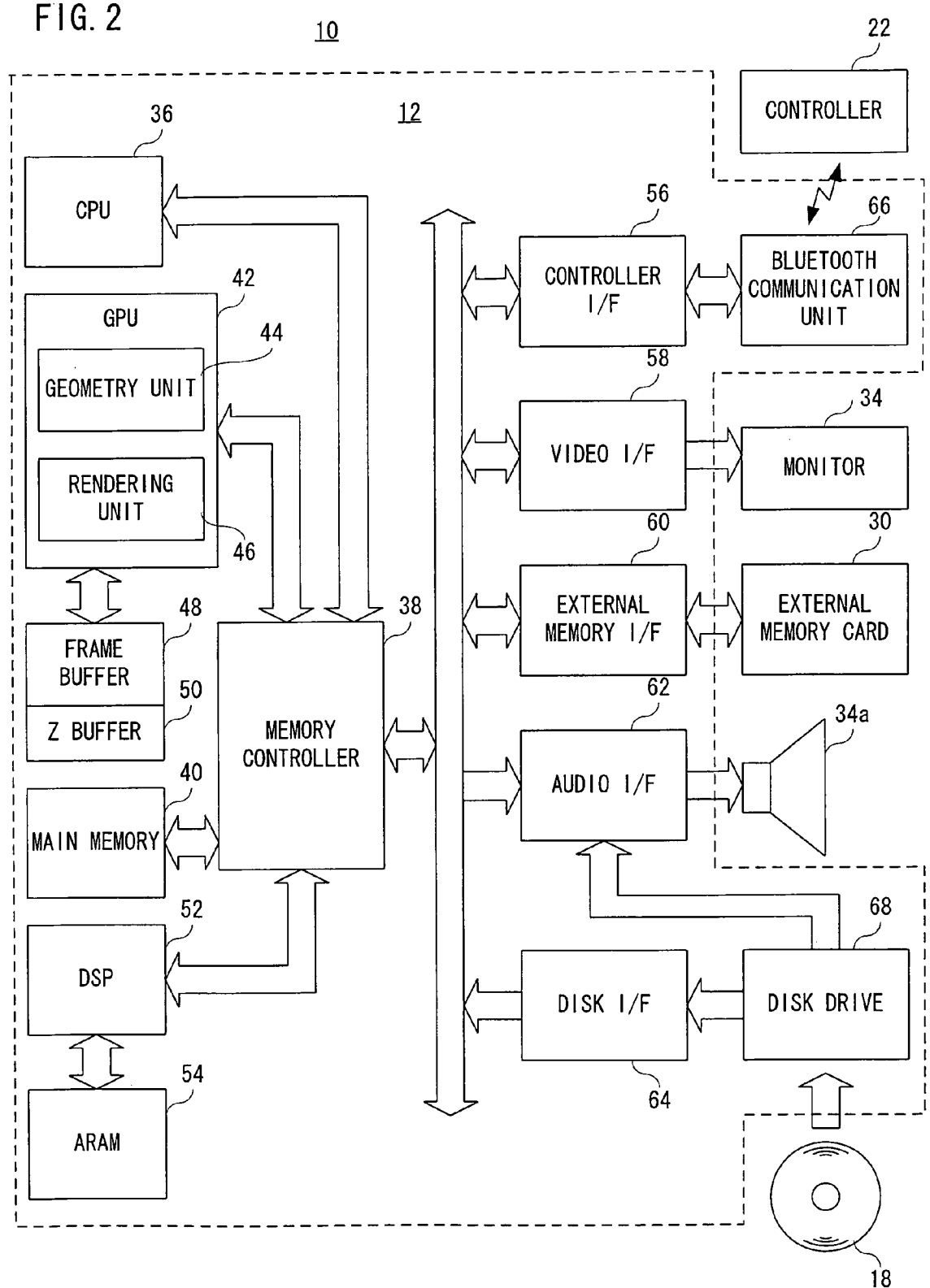
FIG. 2 is a block diagram showing an electric configuration of a game system shown in FIG. 1.

FIG. 2 is a block diagram showing an electric configuration of the video game system 10 in FIG. 1 embodiment. A CPU 36 is provided in the video game apparatus 12. The CPU 36 is in charge of an overall control of the video game apparatus 12. The CPU 36 functions as a game processor, and is connected with a memory controller 38 via a bus. The memory controller 38 mainly controls writing and reading of a main memory 40 connected via the bus under the control of the CPU 36. The memory controller 38 is connected with a GPU (Graphics Processing Unit) 42.

The GPU 42 forms a part of a rendering means, and is constituted by a single chip ASIC, for example, receives a graphics command (rendering command) from the CPU 36 via the memory controller 38, and by following the command thus received, generates a 3D game image by a geometry unit 44 and a rendering unit 46. Namely, the geometry unit 44 performs arithmetic processing of rotation, movement, and deformation, etc, of each kind of object of three dimensional coordinate system (formed of a plurality of polygons, and the polygon refers to a polygonal plane defined by at least three vertexes coordinates.) The rendering unit 46 performs image generation processing such as attaching a texture (texture image) to each polygon of each kind of object, and so forth. Accordingly, the 3D image data to be displayed on the game screen is generated by the GPU 42, and the image data thus generated is stored in a frame buffer 48.

Note that necessary data (primitive or polygon and texture, etc) in performing the graphics command by the GPU 42 is obtained from the main memory 40 by the GPU 42 via the memory controller 38.

The frame buffer 48 is a memory for drawing (accumulating) the image data of one frame of a raster scan monitor 34, for example, and is overwritten for every one frame by the GPU 42. Specifically, the frame buffer 48 sequentially stores chromatic information of an image for each one pixel. Here, the chromatic information refers to data on R, G, B, A, and for example, corresponds to R (red) data of 8 bits, G (green) data of 8 bits, B (blue) data of 8 bits, and A (alpha) data of 8 bits. Note that A data is the data on a mask (mat image). The 3D image of the game image is displayed on the screen of the monitor 34 by reading the data of the frame buffer 48 via the memory controller 38 by a video I/F 58 as will be described later.

In addition, a Z buffer 50 has a storage capacity corresponding to the number of bits of depth data per the number of pixels corresponding to the frame buffer 48 X one pixel, and stores depth information or depth data (Z value) of dots corresponding to each storage location of the frame buffer 48.

Both of the frame buffer 48 and the Z buffer 50 may be constituted by using one portion of the main memory 40, and also these buffers may be provided inside the GPU 42.

In addition, the memory controller 38 is connected to a RAM for audio (referred to as "ARAM" hereafter), via a DSP (Digital Signal Processor) 52. Accordingly, the memory controller 38 controls writing and/or reading of the ARAM 54 as a sub-memory as well as that of the main memory 40.

The DSP 52 works as a sound processor, and generates audio data corresponding to sound, voice or music necessary for the game, by using sound data (not shown) stored in the main memory 40 and by using sound wave (tone) data (not shown) written in the ARAM 54.

The memory controller 38 is further connected to each interface (I/F) 56, 58, 60, 62, and 64 by the bus. The controller I/F 56 is an interface for the controller 22 connected to the video game apparatus 12 via a Bluetooth communication unit 66. More specifically, the Bluetooth communication unit 66 receives input data sent from the controller 22, and the controller I/F 56 applies the input data to the CPU 36 through the memory controller 38. It should be noted that in this embodiment, the input data includes at least any one of operation data, acceleration data, and marker coordinate data described later. Also, the Bluetooth communication unit 66 receives audio data created by the CPU 36 through the main memory 40 and the controller I/F 56, and sends the received audio data to the controller 22 to be sent.

It should be noted that in FIG. 2, only one controller 22 is displayed for simplicity, but as described by utilizing FIG. 1, a maximum of four controllers 22 are connected to the video game apparatus 12.

The video I/F 58 accesses the frame buffer 48, reads the image data generated by the GPU 42, and applies an image signal or the image data (digital RGBA pixel value) to the monitor 34 via the AV cable 32*a* (FIG. 1).

The external memory I/F 60 associates the memory card 30 (FIG. 1) inserted into the front face of the video game apparatus 12 with the memory controller 38. Whereby, the CPU 36 can write the data into the memory card 30, or can read out the data from the memory card 30 via the memory controller 38. The audio I/F 62 receives audio data given from the DSP 52 through the memory controller 38 or audio stream read from the optical disk 18, and gives an audio signal (sound signal) corresponding thereto to a speaker 34*a* of the monitor 34.

Further, the disk I/F 64 connects the disk drive 68 to the memory controller 38, and therefore the CPU 36 controls the disk drive 68. By this disk drive 68, program data and texture data, etc, read out from the optical disk 18 are written into the main memory 40 under the control of the CPU 36.

Additionally, in FIG. 2, for simplicity, the sensor bar 34*b* and the power supply circuit are omitted.

Figure 3:
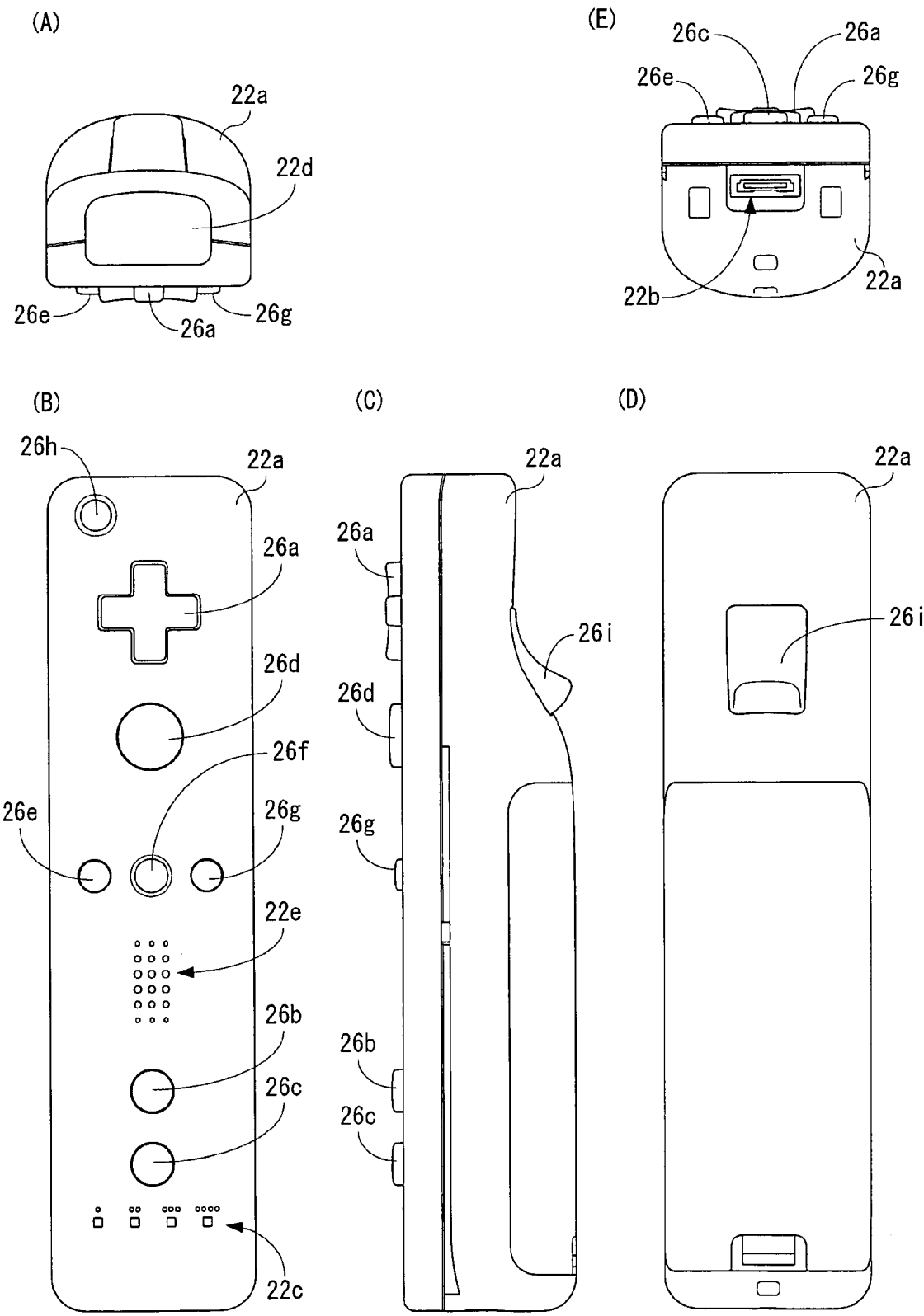
FIG. 3 is an illustrative view showing an appearance of a controller shown in FIG. 1.

Each of FIG. 3(A) to FIG. 3(E) shows one example of an external appearance of the controller 22. FIG. 3(A) shows a front end surface of the controller 22, FIG. 3(B) shows a top surface of the controller 22, FIG. 3(C) shows a right side surface of the controller 22, FIG. 3(D) shows a rear surface of the controller 22, and FIG. 3(E) shows a back end surface of the controller 22.

Referring to FIG. 3(A) and FIG. 3(E), the controller 22 has a housing 22*a* formed by plastic molding, for example. The housing 22*a* is formed into an approximately rectangular parallelepiped shape, having a size small enough to be held by one hand of a user. As described above, the input means (a plurality of buttons or switches) 26 are provided in the housing 22*a* (controller 22). Specifically, as shown in FIG. 3(B), on an upper face of the housing 22*a* (controller 22), there are provided a cross key 26*a*, an X-button 26*b*, a Y-button 26*c*, an A-button 26*d*, a select switch 26*e*, a menu (home) switch 26*f*, a start switch 26*g*, and a power supply switch 26*h*. Moreover, as shown in FIG. 3(C) and FIG. 3(D), an inclined surface is formed on a lower face of the housing 22*a*, and a B-trigger switch 26*i* is formed on the rearward inclined surface.

The cross key 26*a* is a four directional push switch, including four directions of front (or upper), back (or lower), right and left operation parts. By operating any one of the operation parts, it is possible to instruct a moving direction of a character or object (player character or player object) that is be operable by a player or instruct the moving direction of a cursor.

The X-button 26*b* and the Y-button 26*c* are respectively push button switches, and are used for adjusting a viewpoint position and a viewpoint direction on displaying the 3D game image, i.e. a position and an image angle of a virtual camera. Alternatively, the X-button 26*b* and the Y-button 26*c* can be used for the same operation as that of the A-button 26*d* and the B-trigger switch 26*i* or an auxiliary operation.

The A-button switch 26*d* is the push button switch, and is used for causing the player character or the player object to take an action other than that instructed by a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command and so forth.

The select switch 26*e*, the menu switch 26*f*, the start switch 26*g*, and the power supply switch 26*h* are also push button switches. The select switch 26*e* is used for selecting a game mode. The menu switch 26*f* is used for displaying a game menu (menu screen). The start switch 26*g* is used for starting (re-starting) or temporarily posing the game. The power supply switch 26*h* is used for turning on/off a power supply of the video game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26*i* is also the push button switch, and is mainly used for inputting a trigger such as shooting and designating a position selected by the controller 22. In a case that the B-trigger switch 26*i* is continued to be pressed, it is possible to make movements and parameters of the player object constant. In a fixed case, the B-trigger switch 26*i* functions in the same way as a normal B-button, and is used for canceling the action determined by the A-button 26*d*.

As shown in FIG. 3(E), an external expansion connector 22*b* is provided on a back end surface of the housing 22*a*, and as shown in FIG. 3(B), and an indicator 22*c* is provided on the top surface and the side of the back end surface of the housing 22*a*. The external expansion connector 22*b* is utilized for connecting another controller not shown. The indicator 22*c* is made up of four LEDs, for example, and shows identification information (controller number) of the controller 22 by lighting any one of the four LEDs.

In addition, the controller 22 has an imaged information arithmetic section 80 (see FIG. 4), and as shown in FIG. 3(A), on the front end surface of the housing 22*a*, light incident opening 22*d* of the imaged information arithmetic section 80 is provided. Furthermore, the controller 22 has a speaker 86 (see FIG. 4), and the speaker 86 is provided inside the housing 22a at the position corresponding to a sound release hole 22e between the X button 26b and the menu switch 26f on the tope surface of the housing 22a as shown in FIG. 3(B).

Note that as shown in FIG. 3(A) to FIG. 3(E), the shape of the controller 22 and the shape, number and setting position of each input means 26 are simply examples, and needless to say, even if they are suitably modified, the present invention can be realized.

Figure 4:
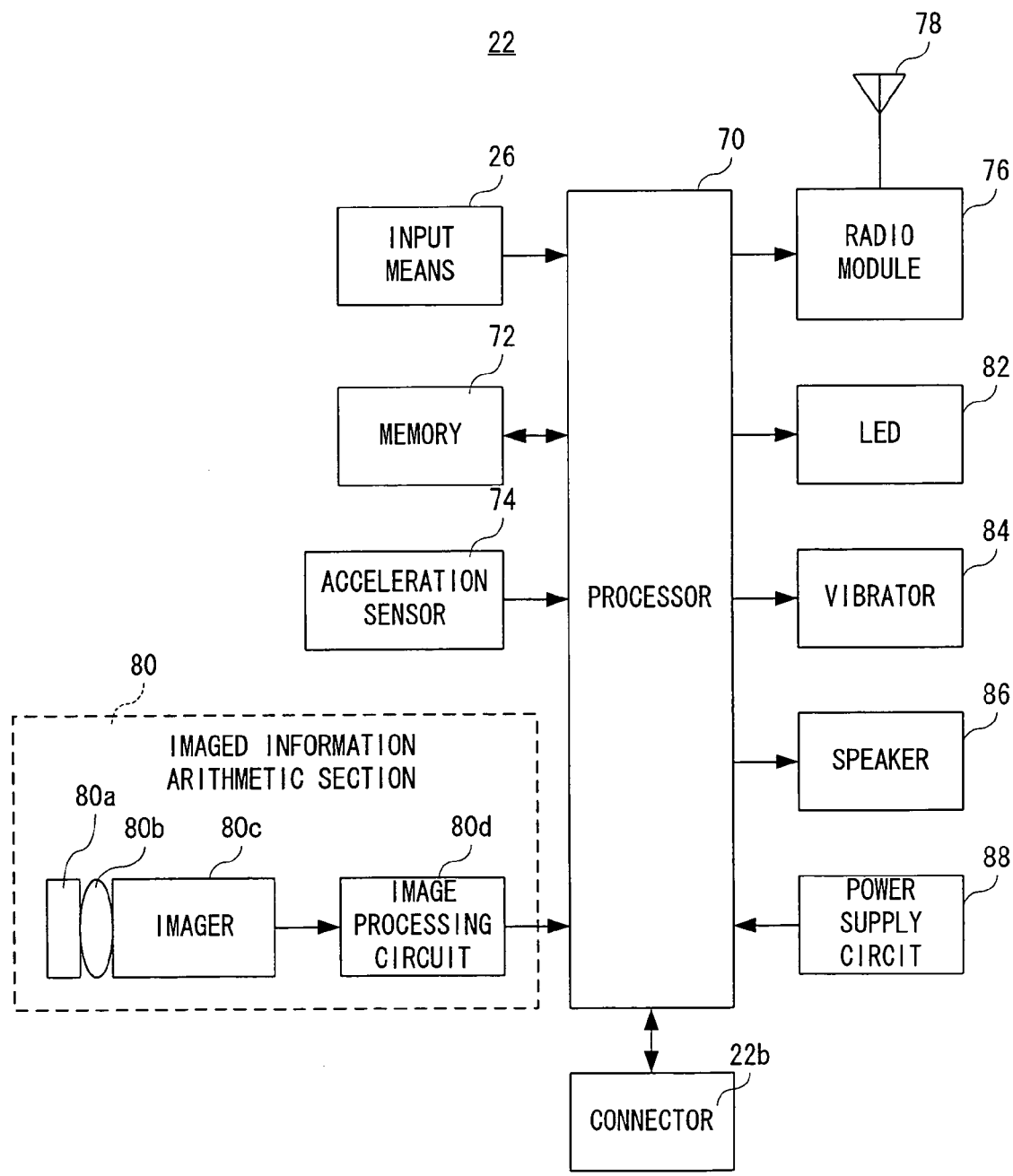
FIG. 4 is a block diagram showing an electric configuration of the controller shown in FIG. 1.

FIG. 4 is. a block diagram showing the electric configuration of the controller 22. Referring to FIG. 4, the controller 22 includes a processor 70, and the processor 70 is connected with the external expansion connector 22b, the input means 26, a memory 72, an acceleration sensor 74, a radio module 76, the imaged information arithmetic section 80, an LED 82 (the indicator 22c), an vibrator 84, a speaker 86, and a power supply circuit 88 by an internal bus (not shown). Moreover, an antenna 78 is connected to the radio module 76.

The processor 70 is in charge of an overall control of the controller 22, and transmits (inputs) information (input information) inputted by the input means 26, the acceleration sensor 74, and the imaged information arithmetic section 80 as input data, to the video game apparatus 12 via the radio module 76 and the antenna 78. At this time, the processor 70 uses the memory 72 as a working area or a buffer area.

An operation signal (operation data) from the aforementioned input means 26 (26a to 26i) is inputted to the processor 70, and the processor 70 stores the operation data once in the memory 72.

Moreover, the acceleration sensor 74 detects each acceleration in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, az) in each direction of x-axis, y-axis, z-axis for each first predetermined time (such as 200 msec), and inputs the data of the acceleration (acceleration data) thus detected in the processor 70. For example, the acceleration sensor 74 detects the acceleration in each direction of the axes in a range from −2.0 g to 2.0 g (g indicates a gravitational acceleration. The same thing can be said hereafter.). The processor 70 detects the acceleration data given from the acceleration sensor 74 for each second predetermined time (for example, 1 frame: each screen update unit time (1/60 sec)), and stores it in the memory 72 once. The processor 70 generates input data including at least one of the operation data, acceleration data and the marker coordinate data, and transmits the input data thus generated to the video game apparatus 12 for each third predetermined time (1 frame).

In this embodiment, although omitted in FIG. 3(A) to FIG. 3(E), the acceleration sensor 74 is provided inside the housing 22a and in the vicinity of a place where the cross key 26a is arranged.

The radio module 76 modulates a carrier of a predetermined frequency by the input data, by using a technique of Bluetooth, for example, and emits its weak radio wave signal from the antenna 78. Namely, the input data is modulated to the weak radio wave signal by the radio module 76 and transmitted from the antenna 78 (controller 22). The weak radio wave signal thus transmitted is received by a Bluetooth communication unit 66 provided to the aforementioned video game apparatus 12. The weak radio wave thus received is subjected to demodulating and decoding processing, thus making it possible for the video game apparatus 12 (CPU 36) to acquire the input data from the controller 22. Then, the CPU 36 performs game processing, following the input data and the program (game program).

In addition, as described above, the controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights forward the monitor 34. Accordingly, by providing the infrared rays filter 80a, it is possible to image the image of the markers 340m and 340n more accurately. The lens 80b condenses the infrared rays passing thorough the infrared rays filter 82 to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the image to the processor 70 as imaged data for each fourth predetermined time (one frame, for example). It should be noted that a description of the image processing circuit 80d is made later.

Figure 5:
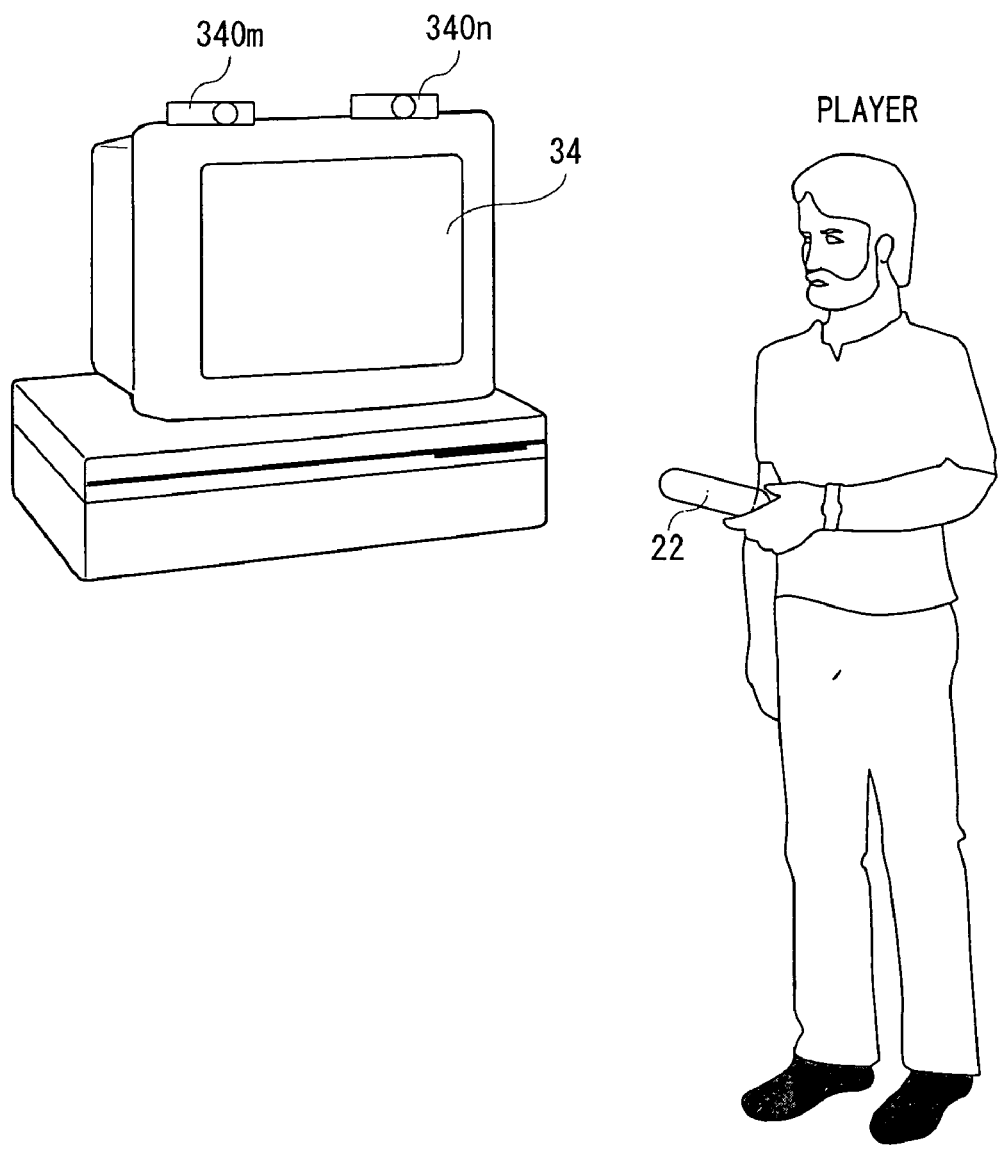
FIG. 5 is an illustrative view roughly showing a state when a game play is performed by utilizing the controllers shown in FIG. 1.

FIG. 5 is an illustrative view summarizing a state when a player plays a game by utilizing a controller 22. As shown in FIG. 5, when playing the game by means of the controller 22 in the video game system 10, the player holds the controller 22 with one hand. Strictly speaking, the player holds the controller 22 in a state that the front end surface (the side of the incident light opening 22d of the light imaged by the imaged information arithmetic section 80) of the controller 22 is oriented to the markers 340m and 340n. It should be noted that as can be understood from FIG. 1, the markers 340m and 340n are placed in parallel with the horizontal direction of the screen of the monitor 34. In this state, the player performs a game operation by changing a position on the screen indicated by the controller 22, and changing a distance between the controller 22 and each of the markers 340m and 340n.

Figure 6:
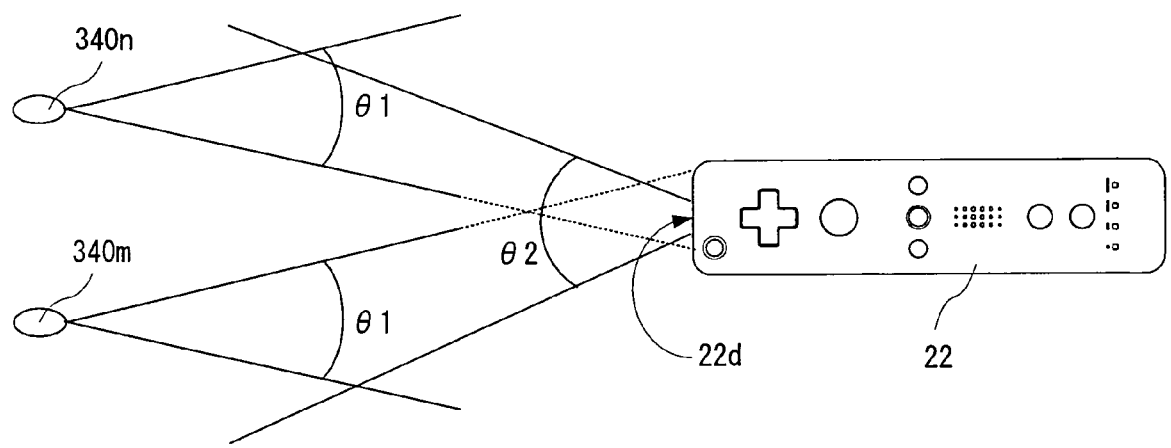
FIG. 6 is an illustrative view showing a viewing angle of a marker and the controller shown in FIG. 1.

FIG. 6 is a view showing viewing angles between the respective markers 340m and 340n, and the controller 22. As shown in FIG. 6, each of the markers 340m and 340n emits infrared ray within a range of a viewing angle θ1. Also, the imager 80c of the imaged information arithmetic section 80 can receive incident light within the range of the viewing angle θ2 taking the line of sight of the controller 22 as a center. For example, the viewing angle θ1 of each of the markers 340m and 340n is 34° (half-value angle) while the viewing angle θ2 of the imager 80c is 41°. The player holds the controller 22 such that the imager 80c is directed and positioned so as to receive the infrared rays from the markers 340m and 340n. More specifically, the player holds the controller 22 such that at least one of the markers 340m and 340n exists in the viewing angle θ2 of the imager 80c, and the controller 22 exists in at least one of the viewing angles θ1 of the marker 340m or 340n. In this state, the controller 22 can detect at least one of the markers 340m and 340n. The player can perform a game operation by changing the position and the orientation of the controller 22 in the range satisfying the state.

Figure 7:
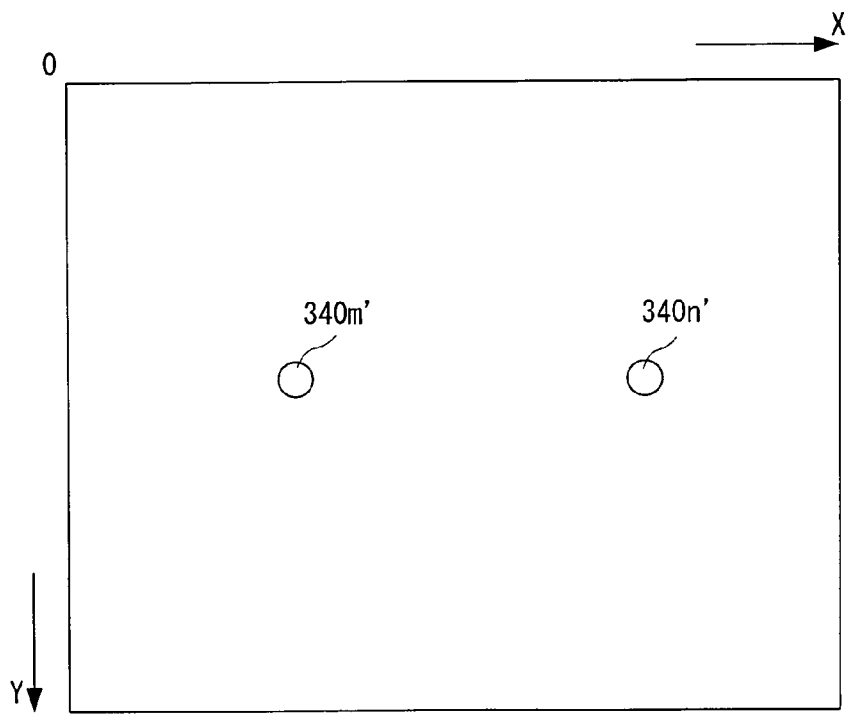
FIG. 7 is an illustrative view showing one example of an imaged image including an object image.

If the position and the orientation of the controller 22 are out of the range, the game operation based on the position and the orientation of the controller 22 cannot be performed. Hereafter, the above-described range is called an "operable range." If the controller 22 is held within the operable range, an image of each of the markers 340m and 340n is imaged by the imaged information arithmetic section 80. That is, the imaged image obtained by the imager 80c includes an image (object image) of each of the markers 340m and 340n as an object to be imaged. FIG. 7 is a view showing one example of the imaged image including an object image. The image processing circuit 80d calculates coordinates (marker coordinates) indicative of the position of each of the markers 340m and 340n in the imaged image by utilizing the image data of the imaged image including the object image.

Since the object image appears as a high-intensity part in the image data of the imaged image, the image processing circuit 80d first detects the high-intensity part as a candidate of the object image. Next, the image processing circuit 80d determines whether or not the high-intensity part is an object image on the basis of the size of the detected high-intensity part. The imaged image may include images other than the object image due to sunlight through a window and light of a fluorescent lamp in the room as well as the images 340m' and 340n' of the two markers 340m and 340n as an object image. The determination processing whether or not the high-intensity part is an object image is executed for discriminating the images 340m' and 340n' of the two markers 340m and 340n as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80d calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 80c. Now, the resolution of the imaged image imaged by the imager 80c shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as an object image by the determination process, and therefore, two marker coordinates are calculated. The image processing circuit 80d outputs data indicative of the calculated two marker coordinates. The data (marker coordinate data) of the output marker coordinates is included in the input data by the processor 70 as described above, and transmitted to the video game apparatus 12.

The video game apparatus 12 (CPU 36) detects the marker coordinate data from the received input data to thereby calculate an instructed position (instructed coordinate) by the controller 22 on the screen of the monitor 34 and a distances from the controller 22 to each of the markers 340m and 340n on the basis of the marker coordinate data. More specifically, the position of the mid point of the two marker coordinates is adopted (calculated) as a position to which the controller 22 faces, that is, an instructed position. The distance between the object images in the imaged image is changed depending on the distance between the controller 22 and each of the markers 340m and 340n, and therefore, the video game apparatus 12 can grasp the distance between the controller 22 and each of the markers 340m and 340n by calculating the distance between the two marker coordinates.

In the game system 10 with such a configuration as described above, a plurality of players play a virtual game by sharing each controller 22. The virtual game is a match-up game, for example, to face off against a plurality of teams, in which each player makes answers of a predetermined number of questions (five, in this embodiment) in turn, and the team wins the game which finishes solving all the question (20 questions) first. However, the player does not take a turn for each question, but a next player's turn comes after the previous player finishes solving the five questions. It should be noted that in this embodiment, the number of players comprising each team is set to "4".

It should be noted that in this embodiment, for simplicity, each player solves the same number of questions, and the number of members for each team is set to become equal. However, if the total number of questions is the same, the number of members comprising the team and the number of questions which each player makes an answer may be different.

Although illustration is omitted, before start of the game, the number of teams to for battling is determined (selected) on the menu screen. At this time, the determined number of teams is coincident with the number of controllers 22 to be utilized. That is, one controller 22 is assigned to one team. Next, a player in each of the teams is selected. In this embodiment, the character created in advance is selected as an avatar of the player. A designation is applied to each character in advance. Here, the designation generally means a mnemonic name, a name, and a denomination, but may be arbitrarily determined such as nickname and numbers by means of kana and numerals. Thus, the player can apply his or her own name, a created designation or the like to the character.

Figure 8:
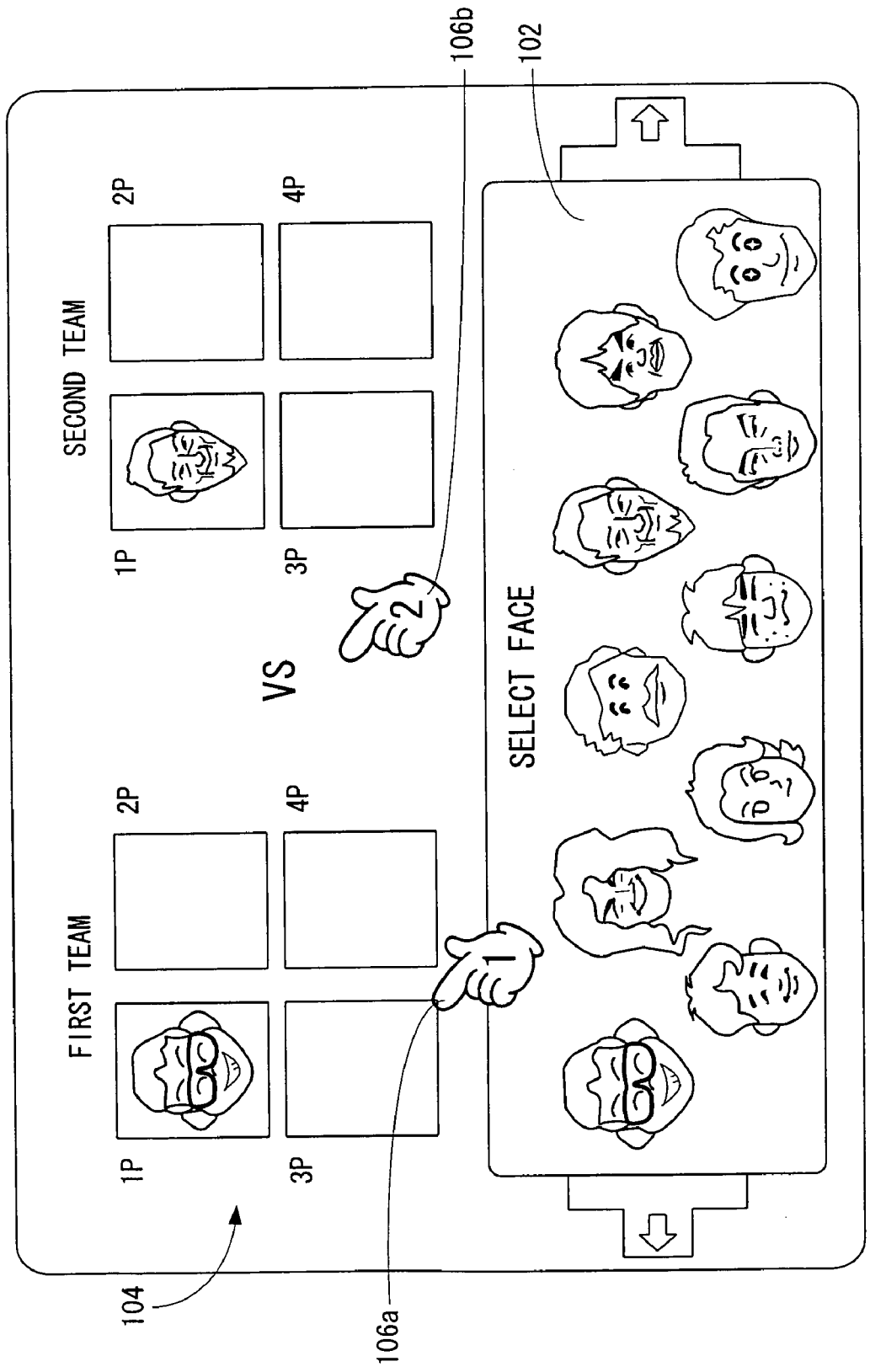
FIG. 8 is an illustrative view showing one example of a character selecting screen to be displayed on a monitor shown in FIG. 1.

FIG. 8 shows a state in which a screen for selecting a screen (character selecting screen) 100 is displayed on the monitor 34 after the number of teams is selected. Here, a description is made on a case that "2" is selected as the number of teams. On the character selecting screen 100, a display portion 102 is provided for displaying facial images of a plurality of characters at an approximately lower half of the screen. Additionally, on the upper half of the character selecting screen 100, a display portion 104 for displaying the facial images of the characters selected by the players of the respective teams is provided. For example, each team is made up of a maximum of four players. It should be noted that this is a merely illustration and not limited thereto. In addition, pointer images 106a and 106b for instructing positions instructed by the two controllers 22 are displayed on the character selecting screen 100. In this embodiment, the pointer image 106a corresponds to the controller 22 (hereinafter, for sake of simplicity, referred to as "22A") assigned to the first team, and the pointer image 106b corresponds to the controller 22 (hereinafter, for sake of simplicity referred to as "22B") assigned to the second team. Accordingly, the pointer image 106a is moved according to the instructed position of the controller 22A, and the pointer image 106*b* is moved according to the instructed position of the controller 22B.

The player instructs a desired facial image out of the plurality of facial images displayed on the display portion 102 by utilizing his own controllers 22A or 22B. That is, the desired facial image is instructed by the pointer image 106*a* or 106*b*. Successively, the player pushes the A button switch 26*d*, for example, to thereby select (determine) the instructed facial image as his or her own avatar. At this time, the facial image, that is, the character selected in correspondence with the controller 22A or 22B is assigned. Strictly speaking, as described later, identification information of the character (character ID) is assigned.

In this manner, each player selects a character (facial image) as his own avatar. Although illustration is omitted, on the character selecting screen 100, scrolling the screen on the display portion 102 from side to side makes it possible to select other facial images.

Figure 9:
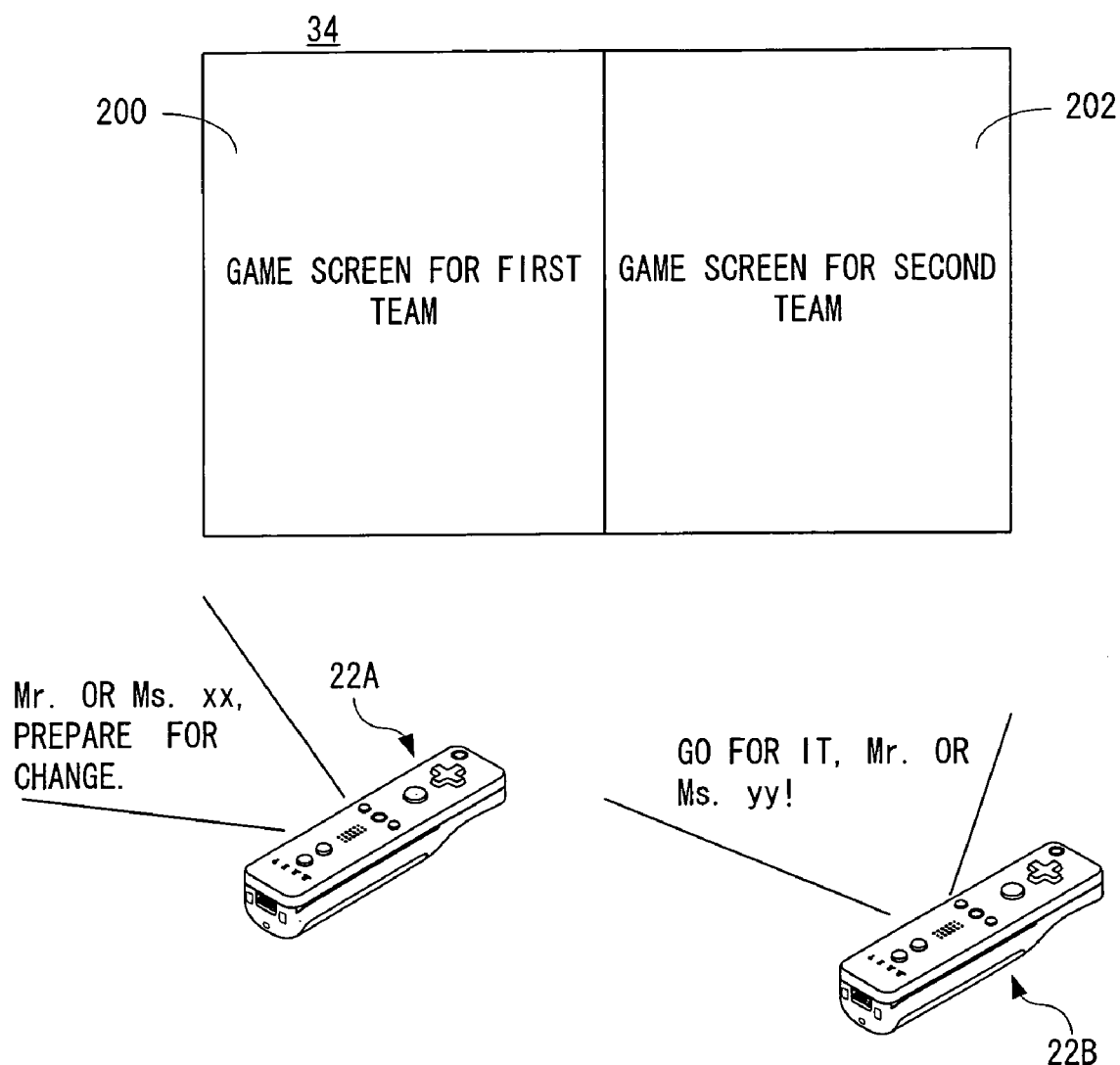
FIG. 9 is an illustrative view showing a display method of a game screen during the game and an example of a message output from the controller.

During the game, game screens (200, 202) are displayed on the monitor 34 as shown in FIG. 9. Here, the game screen for the first team 200 and the game screen for the second team 202 are horizontally evenly divided for playing a match-up game by the two teams. Furthermore, in the match-up game, a player of each team makes an answer to the predetermined number of questions in turn. At this time, a message including a designation of the player depending on a situation (progressing of the game) of each player is output from the speaker 86 of each controller 22 (22A, 22B).

It should be noted that in FIG. 9, for sake of simplicity, players are omitted.

For example, in a case that it takes a lot of time for one question (1), a message of encouragement can be output to the player. Furthermore, in a case that a next player's turn is being to come (2), a message advising that a next player's turn is being to come (prompting the preparation) can be output. In addition, in a case that the next player's turn has come (time for changing the turn) (3), a message of notifying that it is time for changing can be output. More specifically, "Go for it, Mr. or Ms. xx!" and "Calm down, Mr. or Ms. yy!", etc. are equivalent to a message of encouragement. Also, "Mr. or Ms. xx, Prepare for change." and "Mr. or Ms. xx, your turn will come soon." are equivalent to a message of urging preparation. In addition, "It is Mr. or Ms. zz's turn." and "Change places with Mr. or Ms. zz!", or the like are equivalent to a message notifying that it is time for a change (his or her turn has come).

More specifically, out of the above-described message, the text data of the message except for the parts corresponding to the designation of the player or the character are stored in the main memory 40. If a player whose progressing of the game is equivalent to any of the state of (1)-(3) exists, the character is specified as an avatar of the player. Then, the text data of the message corresponding to any of the state (1)-(3) is created by use of the designation of the character. Next, voice message data is created on the basis of the text data. In short, combined audio data for each character such as kana and numerals is stored in advance in the main memory 40, the combined audio data is arranged according to the text data, and the pronunciation, the pitch of a sound, the length of the sound, the articulation of the sound, etc. are adjusted such that the voice is naturally sounded.

The message data (voice message data) of the voice thus created is transmitted to the controller 22 utilized by a player who should receive the message. When receiving the voice message data, the controller 22 converts it to an analog sound signal and outputs it from the speaker 86. Thus, the voice message is transmitted to the player.

Here, the above described progressing of the game (states (1)-(3)) and messages are merely illustration, and it is not limited thereto. It is noted that the message including the designation of the player and the character is properly output from the speaker 86 provided on the controller 22.

Figure 10:
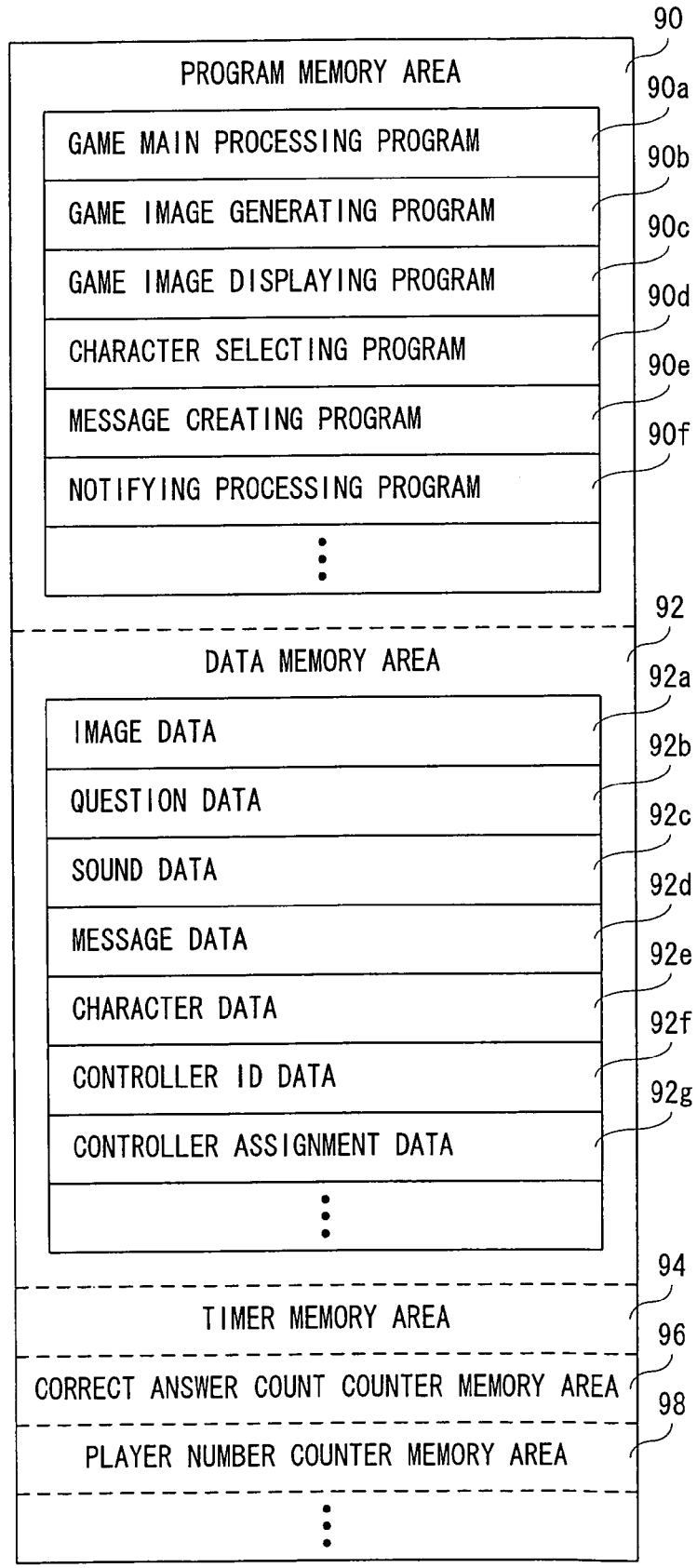
FIG. 10 is an illustrative view showing one example of a memory map of a main memory shown in FIG. 2.

FIG. 10 is one example of a memory map of the main memory 40 shown in FIG. 2. Referring to FIG. 10, the main memory 40 includes a program memory area 90, a data memory area 92, a timer memory area 94, a correct answer count counter memory area 96, a player number counter memory area 98, etc. In the program memory area 90, a game program is stored, and the game program comprises a game main processing program 90*a*, a game image generating program 90*b*, a game image displaying program 90*c*, a character selecting program 90*d*, a message creating program 90*e*, a notifying processing program 90*f*, etc.

The game main processing program 90*a* is a program for processing a main routine of the virtual game in this embodiment. The game image generating program 90*b* is a program for generating a game image or a game screen (including the character selecting screen 100) to be displayed on the monitor 34 by use of the image data 92*a* and the question data 92*b* described later. The game image displaying program 90*c* is a program for displaying the game image generated according to the game image generating program 90*b* on the monitor 34.

The character selecting program 90*d* is a program for selecting a character according to a player's instruction, generating data (described later "controller assignment data 92*g*") bringing the selected character into correspondence with the controller 22 used for the selection, and storing it in the data memory area 92 in a case that the character selecting screen 100 is displayed.

The message creating program 90*e* is a program for creating voice message data including the designation of the player or the character used by the player in correspondence to the progress of the game of the player by utilizing sound data 92*c* and message data 92*d* described later. The notifying processing program 90*f* is a program for transmitting the voice message data created according to the message creating program 90*e* to the controller 22 to which the voice message data requires to be transmitted.

Although illustration is omitted, in the program memory area 90, a sound outputting program, a backup program, etc. are stored. The sound outputting program is a program for outputting a sound necessary for the game, such as a game music (BGM), voice or onomatopoeic sound of the object, a sound effect, or the like from the speaker 34*a*. Also, the backup program is a program for storing the game data in the memory card 30.

In the data memory area 92, data such as image data 92*a*, question data 92*b*, sound data 92*c*, message data 92*d*, character data 92*e*, controller ID data 92*f*, and controller assignment data 92*g* is stored.

The image data 92*a* is data (polygon, texture, etc.) for generating the above-described game image. The question data 92*b* is data for creating the game screen (question screen), and is specifically data as to identification information, an arrangement position, etc. of a game character (character, drawing, image, symbol, etc.) or a game object to be employed in generating the question screen.

The sound data 92*c* is data as to a voice utilized in creating a voice message. More specifically, the sound data 92*c* means the synthetic audio data "a", "i", "u", . . . , "wa" "wo", "n" (in Hiragana in Japanese) of a unit of character. Additionally, the sound data 92*c* includes the synthetic audio data as to characters with voiced sound and semi-voiced sound or numerals.

The message data 92*d* is text data as to a message utilized when creating a voice message output from the speaker 86 of the controller 22. For example, it is the text data of the message in which the parts to fill in the designation are shown by blanks, such as "Go for it, Mr. or Ms.!" or "Ms., Prepare for it.", "Take places with Mr. or Ms. !" ( means blanks.) Additionally, the designation is fetched (detected) as necessary and incorporated in the text data described later.

The character data 92*e* is data relating to a character (facial image) which the player selects as an avatar. In this embodiment, as shown in FIG. 11(A), image data (facial image data) and designation data (data of the designation applied to the facial image) are stored by making them into correspondence with each identification information of a character (character ID (A, B, C, . . . ,F, G, H, . . . )).

The controller ID data 92*f* is data relating to identification information of each controller 22 utilized in the game. In this embodiment, as shown in FIG. 11(B), a controller ID (I, II, III, IV) is applied to each controller 22. In this embodiment, a maximum of four controllers 22 can be connected to the video game apparatus 12, and therefore, the controller ID is also a maximum of four. However, the controller ID is not applied to the controller 22 not utilized in the game. In addition, in this embodiment, the video game apparatus 12 identifies each controller 22 by an MAC address of the wireless module 76 incorporated in the controller 22. The identification information of the controller 22 is not limited to the MAC address, and identification information specific to the controller 22 may be stored in advance inside the controller 22.

The controller assignment data 92*g* is data for identifying a player (strictly, character as an avatar) utilizing each controller 22, and for storing the number of players who select the respective controllers 22 in a case of the characters are selected prior to start of the game. More specifically, as shown in FIG. 12(A), the character ID and the number of selections are stored by making them into correspondence with the controller ID. Here, the character ID is the identification information of each of the above-described characters (facial images). For example, the order of describing the character ID indicates the order of playing (the first, the second, the third, the fourth from the left). Also, the number of selections indicates the number of players selecting (utilizing) the same controller 22 at a character selection. However, a player (character) is not assigned to the controller 22 not utilized in the game, and therefore, the controller ID, etc. of the controller 22 is not described in the controller assignment data 92*g*. The same holds true for the following.

Although illustration is omitted, in the data memory area 92, game data, sound data, other flags, etc. are stored. For example, the main memory 40 is used as a buffer memory, and temporarily stores input data (data including at least any one of the operation data, the acceleration data, and the marker coordinate data).

The timer memory area 94 stores a timer assigned to each of the controllers 22. As shown in FIG. 12(B), the timer (first timer, second timer, third timer, fourth timer) is set in correspondence with the controller ID. Each timer is used for counting a time during which one player (the same player) utilizes a controller 22 indicated by the controller ID. FIG. 12(B) shows a case in which four controllers 22 are used.

In the correct answer count counter memory area 96, a counter assigned to each controller 22 is stored. As shown in FIG. 13(A), a counter (first correct answer count counter, second correct answer count counter, third correct answer count counter, fourth correct answer count counter) is set in correspondence with the controller ID. Each counter is utilized for counting the number of questions to which the player using the controller 22 indicated by the corresponding controller ID gives a correct answer. With reference to the count value of the correct answer counter, if the player who gives 4 correct answers exists, the player can know that it is almost time to change with a next player. Also, if the player who gives 5 correct answers exists, the player knows that the next player's turn has come.

Furthermore, it is possible to know the order of the players on the basis of the controller assignment data 92*g* described above and a player number counter described later. FIG. 13(A) shows a case that four controllers 22 are utilized.

In the player number counter memory area 98, a counter assigned to each controller 22 is stored. As shown in FIG. 13(B), a counter (first player number counter, second player number counter, third player number counter, fourth player number counter) are set in correspondence with the controller ID. Each player number counter is used for counting the order (the number) of players who utilize the controller 22 indicated by the corresponding controller ID. FIG. 13(B) shows a case that four controllers 22 are utilized.

Figure 14:
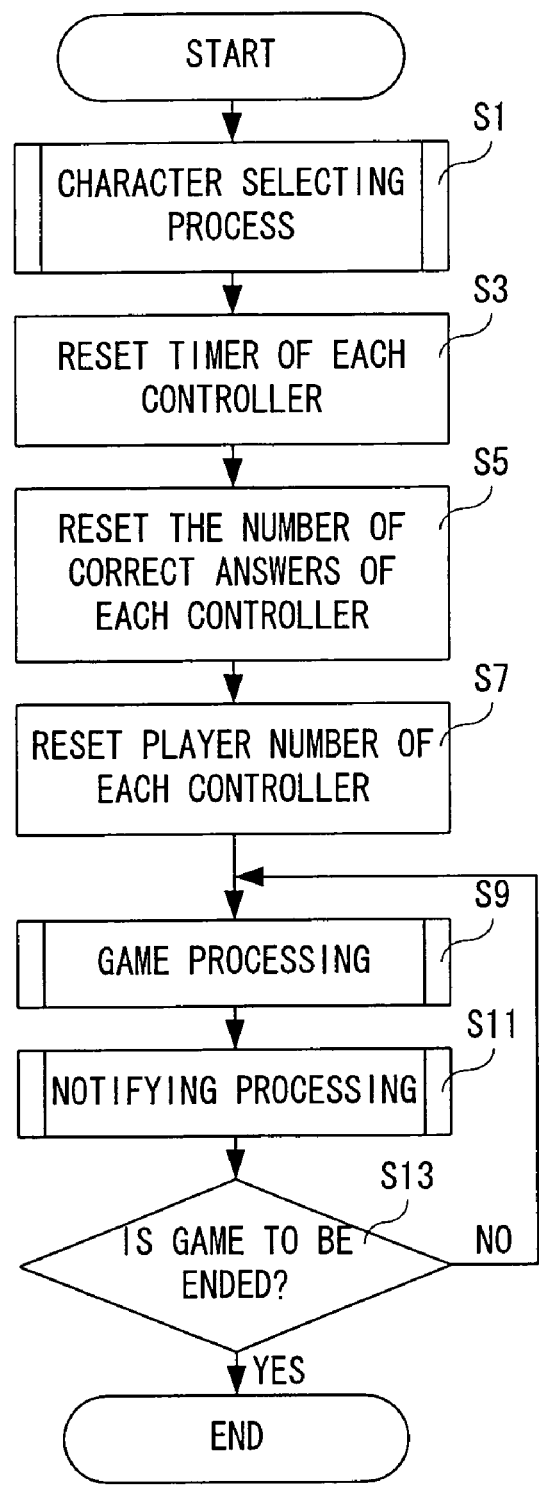
FIG. 14 is a flowchart showing an entire process of a CPU shown in FIG. 2.

More specifically, the CPU 36 shown in FIG. 2 executes an entire process according to a flowchart shown in FIG. 14. As shown in FIG. 14, when staring the entire process, the CPU 36 executes a character selecting process (see FIG. 15) in a step S1. In a next step S3, a timer provided in the timer memory area 94 of each controller 22 is reset. Here, the timer value of the timer set to the controller 22 utilized for the game is set to an initial value "0".

The controller 22 utilized in the game is determined prior to the start of the game (before the entire process), and a timer is set in correspondence with each of the controllers 22 to be utilized.

In a succeeding step S5, the number of correct answers of each controller 22 is reset. Here, the count value of the correct answer counter set to the controller 22 utilized in the game is set to an initial value "0". Successively, in a step S7, a player number of each controller 22 is reset. Here, the count value of the player number counter corresponding to the controller 22 utilized in the game is set to an initial value "1".

After reset of the timer and the counter, in a next step S9, a game processing (see FIG. 16) is executed. Next, in a step S11, a notifying processing (see FIG. 17-FIG. 19) is executed. Then, in a step S13, it is determined whether or not the game is to be ended. Here, it is determined whether or not the game is over, or whether or not an instruction for the game end is applied from the player. If "NO" in the step S13, that is, if the game is not to be ended, the process directly returns to the step S9. On the other hand, if "YES" in the step S13, that is, if the game is ended, the entire process is ended as it is.

Figure 15:
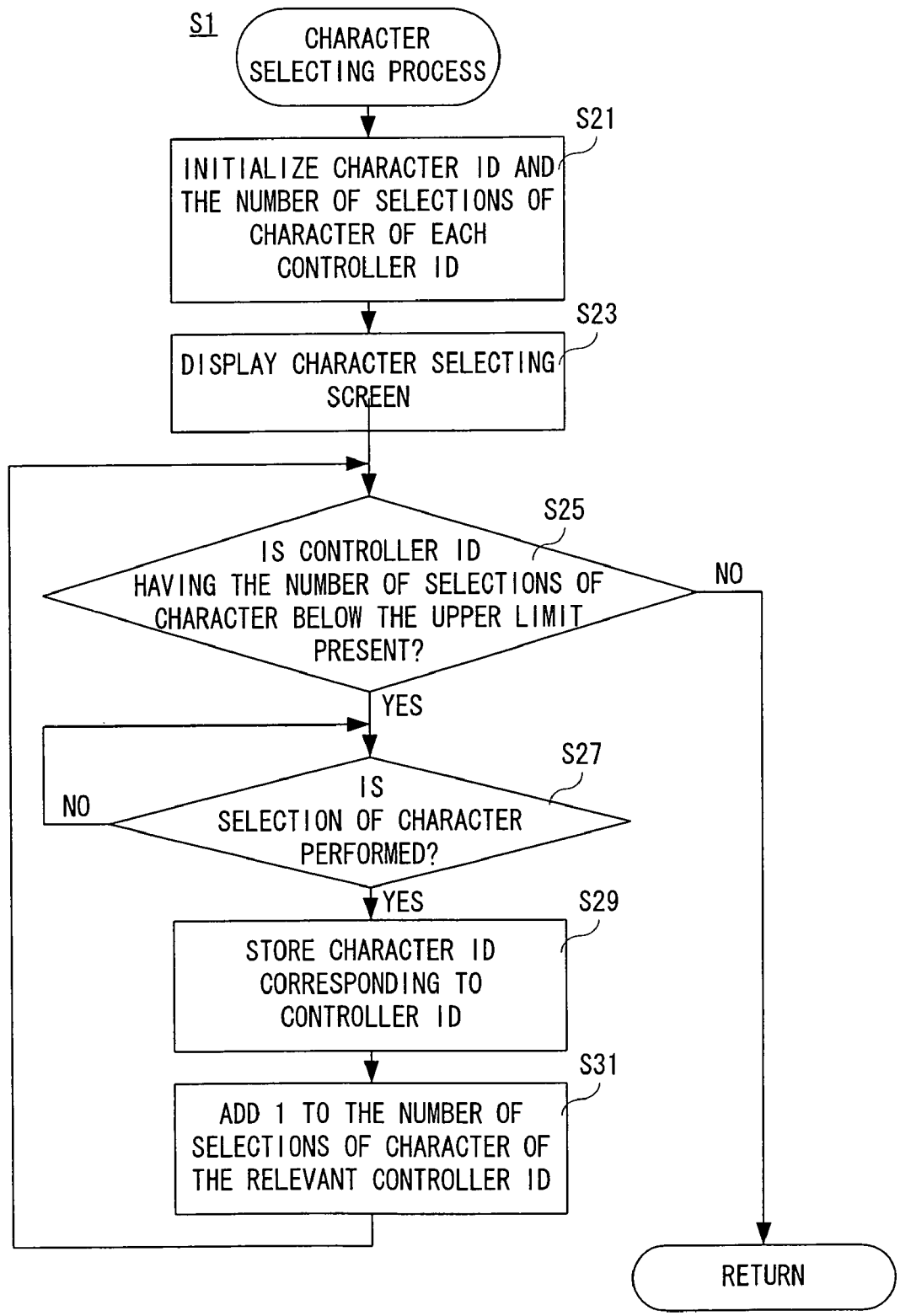
FIG. 15 is a flowchart showing a character selecting process of the CPU shown in FIG. 2.

FIG. 15 is a flowchart showing a character selecting process shown in the step S1 in FIG. 14. As shown in FIG. 15, when starting the character selecting process, the CPU 36 initializes a character ID and the number of selections of the character of each controller ID in a step S21. That is, the character ID described in correspondence to the controller ID of the controller assignment data 92*g* is erased, and the initial value of the number of selections is set to "0".

In a succeeding step S23, the character selecting screen 100 shown in FIG. 8 is displayed. Accordingly, the player selects a character on the character selecting screen 100 by utilizing the controller 22 used in the team. Successively, in a step S25, it is determined whether or not a controller ID having the number of selections of the character below the upper limit ("4", for example) is present. If "NO" in the step S25, that is, if the controller ID having the number of selections of the character below the upper limit is absent, the process returns the entire process shown in FIG. 14 in order to forcedly end the character selecting process.

On the other hand, if "YES" in the step S25, that is, if the controller ID having the number of selections of the character below the upper limit is present, it is determined that the selection of the character has not yet been finished, and it is determined whether or not the selection of the character is performed in a step S27.

If "NO" in the step S27, that is, if the selection of the character is not performed, the process returns to the same step S27 in order to wait the selection of the character. On the other hand, if "YES" in the step S27, that is, if the selection of the character is performed, the character ID of the character selected in correspondence with the controller ID is stored in a step S29. That is, the controller 22 from which a selection instruction of the character is present is specified from the MAC address, and the character ID is described in the controller assignment data 92g in correspondence with the controller ID of the specified controller 22. Then, in a step S31, the number of the selections of the character with the controller ID is added by one, and then, the process returns to the step S25. That is, in a step S31, the number of the selections corresponding to the controller ID whose character ID is described in the step S29 is added by one.

Figure 16:
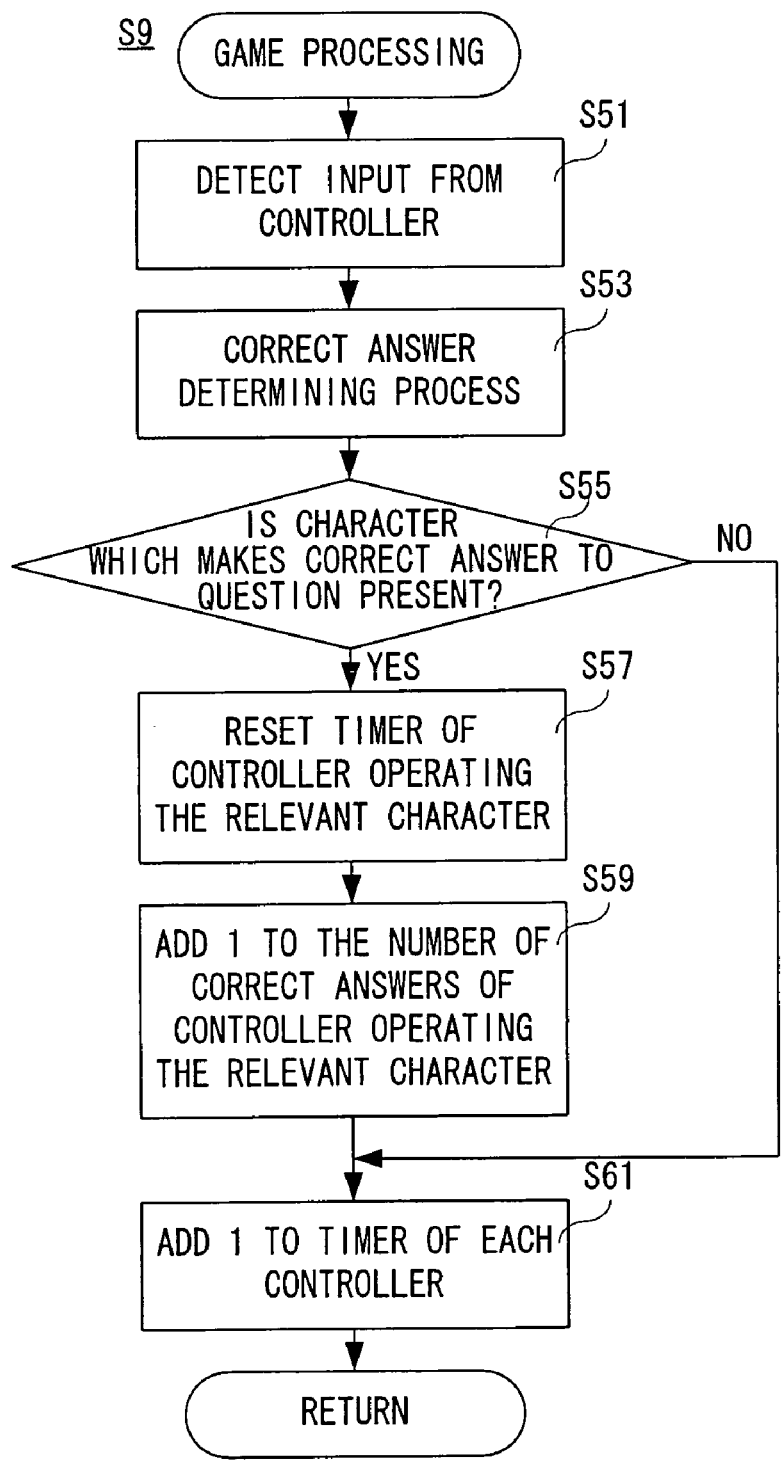
FIG. 16 is a flowchart showing a game processing of the CPU shown in FIG. 2.

FIG. 16 is a flowchart showing the game processing in the step S9 shown in FIG. 14. As shown in FIG. 16, when starting the game processing, the CPU 36 detects an input from the controller 22 in a step S51. More specifically, the CPU 36 detects the input data stored in the buffer memory (not illustrated) of the controller I/F 56. However, if input data is not stored in the buffer memory of the controller I/F 56, the CPU 36 determines that no input is performed from the controller 22.

In a next step S53, a correct answer determining process is executed. Although a detailed description is omitted, it is determined whether or not the answer by the player according to the input data from the controller 22 is coincident with the correct answer here. Also, if there is no input from the controller 22, the CPU 36 determines that a correct answer is not given. In a next step S55, it is determined whether or not a character which gives a correct answer to the question exists. If "NO" in the step S55, that is, if a character which gives a correct answer to the question does not exist, the process directly shifts to a step S61.

On the other hand, if "YES" in the step S55, that is, if a character which gives a correct answer to the question exists, a timer of the controller 22 which operates the relevant character is reset in a step S57. That is, the CPU 36 obtains the controller ID which operates the character which gives a correct answer to the question with reference to the controller ID data 92f and the controller assignment data 92g, and sets the timer value of the timer corresponding to the obtained controller ID to "0" with reference to the timer memory area 94.

In a succeeding step S59, the number of correct answers of the controller 22 which operates the relevant character is added by one. That is, the CPU 36 adds the count value of the correct answer counter corresponding to the controller ID obtained as described above by one with reference to the correct answer count counter memory area 96. Then, in the step S61, one is added to the timer of each controller 22, and the process returns the entire process. That is, in the step S61, the CPU 36 adds the timer values of all the timers set to the timer memory area 94 by one.

Figure 17:
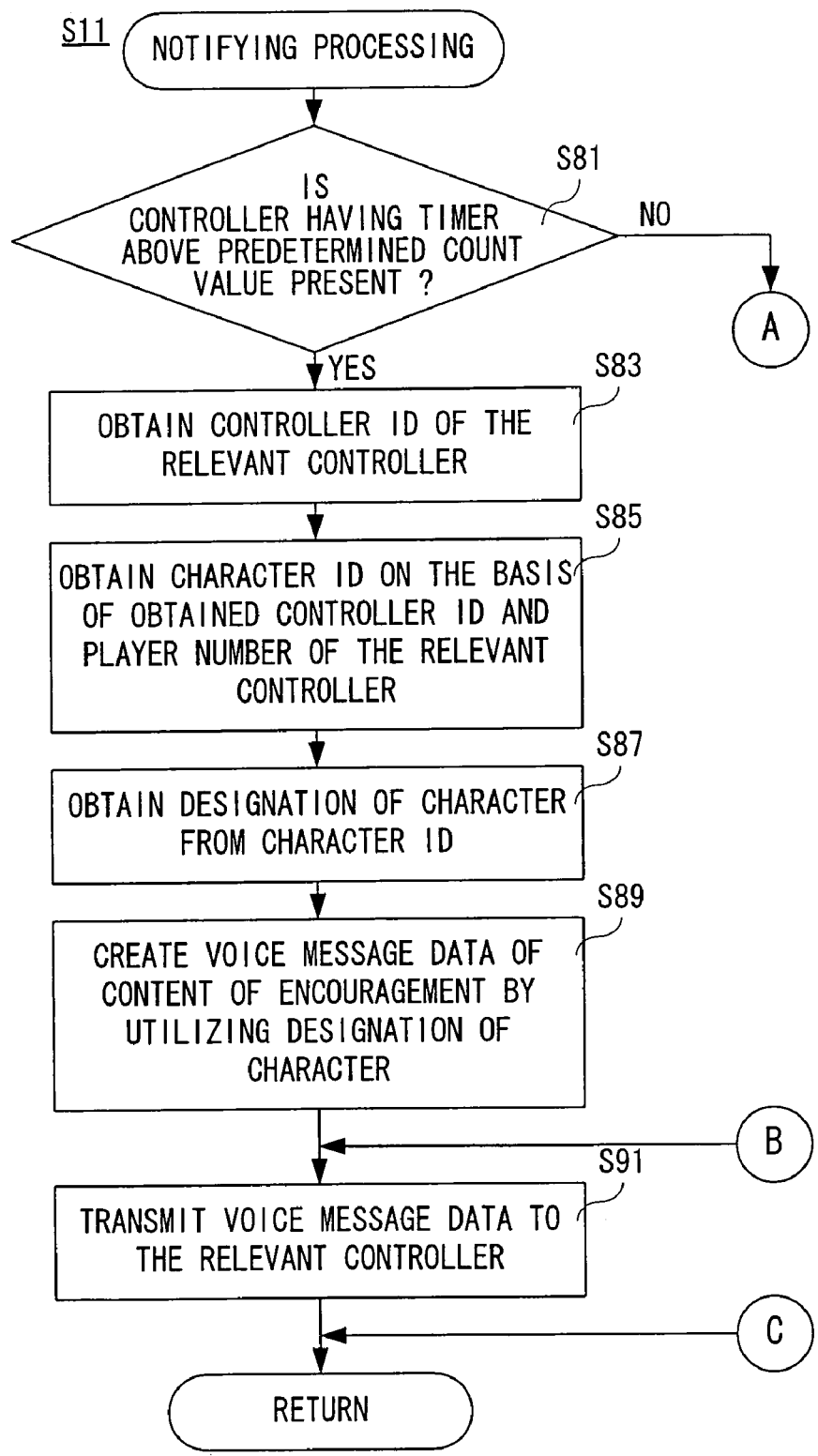
FIG. 17 is a flowchart showing a part of a notifying process of the CPU shown in FIG. 2.
Figure 18:
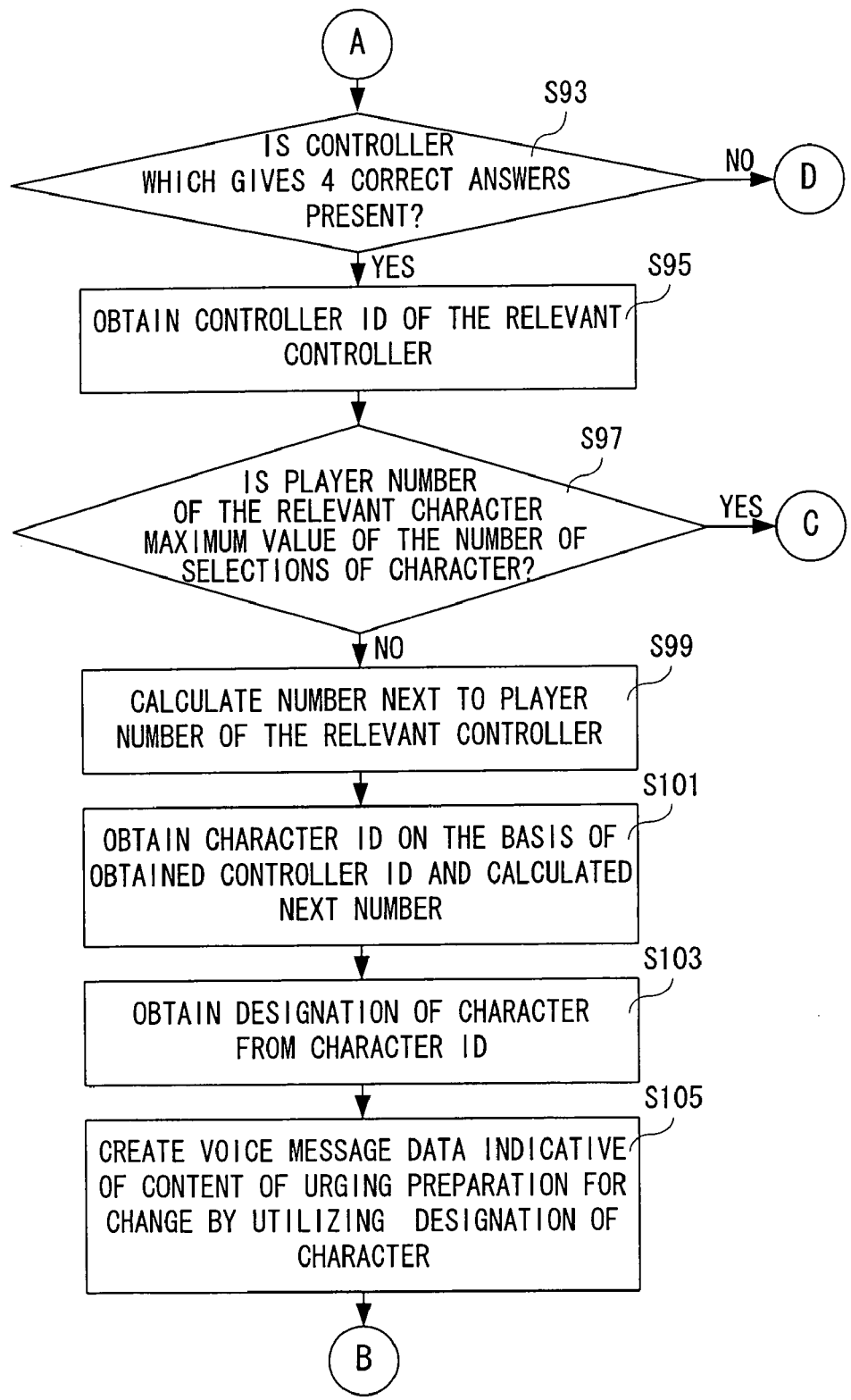
FIG. 18 is a flowchart continued from FIG. 17 showing another part of the notifying process of the CPU shown in FIG. 2.
Figure 19:
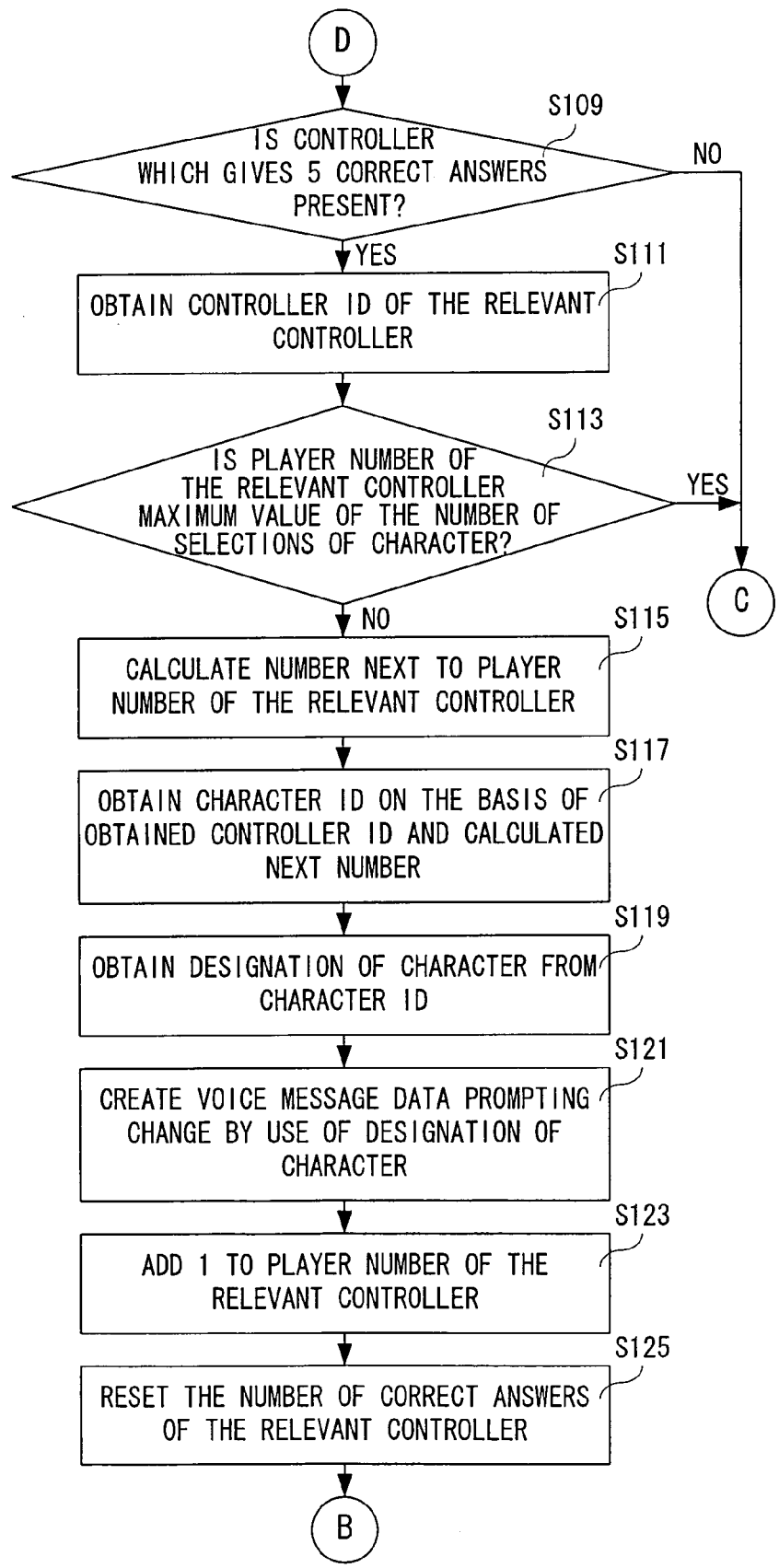
FIG. 19 is a flowchart continued from FIG. 18 showing the other part of the notifying process of the CPU shown in FIG. 2.

FIG. 17-FIG. 19 is a flowchart showing a notifying process of the step S11 shown in FIG. 14. As shown in FIG. 17, when starting a notifying process, the CPU 36 determines whether or not a controller 22 having a timer above a predetermined count value (10 seconds, for example) is present in a step S81. If "NO" in the step S81, that is, if a controller 22 having a timer above a predetermined count value is absent, the process proceeds to a step S93 shown in FIG. 18.

On the other hand, if "YES" in the step S81, that is, if a controller 22 having a timer above a predetermined count value is present, the controller ID of the relevant controller 22 is obtained in a step S83. In a next step S85, the character ID is obtained on the basis of the obtained controller ID and the player number of the relevant controller 22. That is, the character is specified. Then, in a step S87, the designation of the character corresponding to the character ID obtained in the step S85 is obtained.

Then, in a step S89, by means of the designation of the character, voice message data of the content encouraging the player who utilizes the character as an avatar is created. Then, in a step S91, the created voice message data is transmitted to the relevant controller 22, and the entire process is returned.

Although the illustration is omitted as to processing by the processor 70 of the controller 22, when the voice message data is transmitted from the game apparatus 12 by the processing in the step S91, the processor 70 of the controller 22 receives the voice message data via the antenna 78 and the wireless module 76. Next, the processor 70 outputs the voice message data to the speaker 86 via a D/A converter and an amplifier not shown. Accordingly, the voice message data is converted into an analog sound signal and amplified, and then output from the speaker 86. Thus, a voice message is notified to the relevant player from the controller 22.

In the step S93 shown in FIG. 18, it is determined whether or not the controller 22 which gives 4 correct answers is present. Here, it is determined whether or not a controller 22 belonging to player who will change with a next player soon is present. If "NO" in the step S93, that is, if a controller 22 which gives 4 correct answers is absent, the process proceeds to a step S109 shown in FIG. 19. On the other hand, if "YES" in the step S93, that is, if a controller 22 which gives 4 correct answers is present, the controller ID of the relevant controller 22 is obtained in a step S95, and it is determined whether or not the player number of the relevant controller 22 is a maximum value of the number of selections of the character in a step S97. More specifically, with reference to the player number counter memory area 98, the count value of the player number counter corresponding to the controller ID obtained in the step S95 is obtained, and with reference to the controller assignment data 92g, it is determined whether or not the obtained count value is a maximum value ("4", here) of the number of selections.

If "YES" in the step S97, that is, if the player number of the relevant controller 22 is a maximum value of the number of selections of the character, it is determined that a next player utilizing the controller 22 is absent, and the process returns the entire process as shown in FIG. 17. On the other hand, if "NO" in the step S97, that is, if the player number of the relevant controller 22 is not a maximum value of the number of selections of the character, a number next to the player number of the relevant controller 22 is calculated in a step S99. That is, a value obtained by adding one to the count value of the player number counter corresponding to the controller ID obtained in the step S95 is evaluated. However, the actual count value is as it is.

Next, in a step S101, a character ID is obtained on the basis of the obtained controller ID and the calculated next number. That is, a next character is specified. Successively, in a step S103, with reference to the character data 92e, a designation of the character is obtained from the character ID obtained in the step S101. Then, in a step S105, voice message data indicative of the content of urging the preparation for change is created by utilizing the designation of the character, and then, the process proceeds to the step S91 shown in FIG. 17.

As shown in FIG. 19, in the step S109, it is determined whether or not the controller 22 which gives 5 correct answers is present. If "NO" in the step S109, that is, if the controller 22 which gives 5 correct answers is absent, the process returns the entire process as shown in FIG. 17. On the other hand, if "YES" in the step S109, that is, if the controller 22 which gives 5 correct answers is present, the controller ID of the relevant controller 22 is obtained in a step S111, and it is determined whether or not the player number of the relevant controller 22 is a maximum value of the number of selections of the character in a step S113. The detail of the process is the same as the above-described step S97, and therefore, the redundant description will be omitted.

If "YES" in the step S113, that is, if the player number of the relevant controller 22 is a maximum value of the number of selections of the character, it is determined that the team utilizing the controller 22 clears all the questions, and the process returns the entire process as it is. On the other hand, if "NO" in the step S113, that is, if the player number of the relevant controller 22 is not a maximum value of the number of selections of the character, a number next to the player number of the controller 22 is calculated in a step S115. Since the detail of the process is the same as the above-described step S99, the redundant description will be omitted.

In a succeeding step S117, a character ID is obtained on the basis of the controller ID obtained in the step S111 and the next number calculated in the step S115. That is, the next character is specified. Successively, in a step S119, a designation of the character is obtained from the character ID obtained in the step S117. Then, in a step S121, voice message data prompting the change with the next character (informing that its time to change) is created by use of the designation of the character.

Then, in a step S123, the player number of the relevant controller 22 is added by one, and in a step S125, the number of correct answers of the relevant controller 22 is reset, and the process proceeds to the step S91.

According to this embodiment, a voice message including a designation of a player or character is output from the controller utilized or to be utilized by the player in correspondence to the progress of the game, and therefore, even if a plurality of persons share the controller, it is possible to smoothly enjoy playing the game.

It should be noted in this embodiment, a description is made on the match-up game in which a plurality of teams face each other. However, it may be applied to a game in which one team plays a game in a time attack mode. In such a case, a plurality of players take turns using (share) the controller, and a voice message including a designation of the player or character is output from the speaker of the controller in correspondence with the progressing of the game.

In this embodiment, the markers are provided around the monitor while the controller is provided with an imager for imaging infrared lays output from the marker, and whereby, an instructed position by the controller is detected, but it is not limited thereto. For example, a marker is provided on the controller, and an imager is provided around the monitor. Also, a photoreceiver, etc. may be utilized in place of the imager.

In addition, in this embodiment, the controller connected to the game apparatus by radio is utilized, but the controller connected to the game apparatus by a wire may be utilized.

In addition, in this embodiment, voice message data being digital data is transmitted to the controller 22 as a voice message signal, and the controller 22 performs a D/A conversion on it to thereby output a voice message from the speaker 86. However, it is appropriate that an analog sound signal is transmitted to the controller 22 as a voice message signal, and a voice message according to the analog sound signal may be output from the speaker 86. Thus, the "voice message signal" should be construed such that it includes an analog sound signal case and a digital audio data case.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage medium storing a game program executed in a computer of a game apparatus to allow a plurality of players to play a game by taking turns using a controller furnished with a speaker for outputting a voice message according to a voice message signal, said game program causes said computer to execute:

a designation storing step for storing a designation of each of the plurality of players who use said controller by bringing them into correspondence with said controller, a situation storing step for storing situation data relating to progressing of the game of each player, a message creating step for, when the situation data stored by said situation storing step shows a predetermined state related to a change in timing of game play for a designated player, creating a voice message signal including a designation of the designated player by utilizing the designation of the player stored in said designation storing step, and a message transmitting step for transmitting the voice message signal created by said message creating step to said controller, wherein said controller audibly outputs said voice message signal from said speaker to notify said voice message signal to said designated player.

2. A storage medium storing a game program according to claim 1, wherein said game apparatus has a plurality of controllers, said designation storing step stores designations of a plurality of players who use each of said plurality of controllers by bringing them into correspondence with each of a respective one of the controllers, and said message transmitting step transmits the voice message signal created by said message creating step to the respective controller utilized by a player corresponding to the situation data showing said predetermined state.

3. A storage medium storing a game program according to claim 1, wherein said predetermined state includes a first situation in which a play time by the designated player exceeds a predetermined time.

4. A storage medium storing a game program according to claim 1, wherein said predetermined state indicates the turn is about to begin and the designated player is a next player to take a turn.

5. A storage medium storing a game program according to claim 1, wherein said predetermined state indicates the turn is a new term which is beginning and the designated player is to take the new turn.

6. A storage medium storing a game program according to claim 1, wherein said message creating step creates the voice message signal according to the situation indicated by said situation data.

7. A game apparatus allowing a plurality of players to play a game by taking turns using a controller furnished with a speaker for outputting a voice message according to a voice message signal, comprising:
- a designation storing means for storing in a storage means designations of the plurality of players who use said controller by bringing them into correspondence with said controller;
- a situation storing means for storing situation data relating to progressing of the game of each player in said storage means;
- a message creating means for, when the situation data stored by said situation storing means shows a predetermined state related to a change in game play timing for a designated player, creating a voice message signal announcing the change in game play timing and including a designation of the designated player by utilizing the designation of the designated player stored in said designation storing means; and
- a message transmitting means for transmitting the voice message signal created by said message creating means to said controller, wherein
- said controller receives the voice message signal received by said message transmitting means, and audibly outputs a voice message according to the voice message signal from said speaker to notify the voice message to said designated player.

8. A game apparatus according to claim 7, wherein said game apparatus has a plurality of controllers, said designation storing means stores designations of a plurality of players who each use a respective one of said plurality of controllers by defining a correspondence between each player and the respective one of the controller, and
- said message transmitting means transmits the voice message signal created by said message creating means to the controller utilized by a player corresponding to the situation data showing said predetermined state.

9. A game apparatus according to claim 7, wherein said predetermined state includes a first situation in which a play time by the same player exceeds a predetermined time.

10. A game apparatus according to claim 7, said predetermined state includes a second situation in which a next player's turn is being to come.

11. A game apparatus according to claim 7, said predetermined state includes a third situation in which a next player's turn has come.

12. A game controlling method of a game apparatus allowing a plurality of players to play a game by taking turns using a controller furnished with a speaker for outputting a voice message according to a voice message signal, including following steps of:
- (a) storing designations of the plurality of players who use said controller by bringing them into correspondence with said controller,
- (b) storing situation data relating to progressing of the game of each player,
- (c) creating, when the situation data stored by said step (b) shows a predetermined state related to a timing change of a game turn of a designated player, a voice message signal announcing the timing change and including a designation of the designated player by utilizing the designation of the player stored by said step (a),
- (d) transmitting the voice message signal created by said step (c) to said controller, and
- (e) receiving the voice message signal transmitted by said step (d) and outputting a voice message according to said voice message signal from said speaker by said controller to audibly notify the designated player of the voice message.

13. A game controlling method of a game apparatus according to claim 12, said game apparatus has a plurality of controllers,
- said step (a) stores designations of a plurality of players who use each of said plurality of controllers by bringing them into correspondence each of a respective one of the controllers,
- said step (d) transmits the voice message signal created by said step (c) to the respective controller utilized by a player corresponding to the situation data indicating said predetermined state.

14. A game controlling method of a game apparatus according to claim 12, said predetermined state includes a first situation in which a play time by designated player exceeds a predetermined time.

15. A game controlling method of a game apparatus according to claim 12, said predetermined state includes a second situation in which a next player's turn is being to come.

16. A game controlling method of a game apparatus according to claim 12, said predetermined state indicates the turn in a new turn which is beginning and the designated player is to take the new turn.

17. A storage medium storing a game program executed in a computer of a game apparatus to allow a plurality of players to play a game by taking turns by each using one of a plurality of controllers, wherein each of the controllers is furnished with a speaker for outputting a voice message according to a voice message signal, said game program causes said computer to execute:
- a designation storing step for storing a designation of each of the plurality of players who use one of said controllers by establishing a correspondence between each player and a respective one of-said controllers,
- a situation storing step for storing situation data relating to progressing of the game of each player,
- a message creating step for, when the situation data stored by said situation storing step shows a predetermined state indicative of a change in a game play turn assigned to one of the plurality of players, creating a voice message signal indicating the change in the game play turn and including a designation of the player assigned to said game play turn by utilizing the designation of the player stored in said designation storing step,
- a message transmitting step for transmitting the voice message signal created by said message creating step to said respective controller designated for the player corresponding to said situation data and not sending the message signal to the controllers designated for the players not corresponding to the situation data, and
- speaking a voice message based on the voice message signal received by said controller designated for the player corresponding assigned to the game play turn.

18. The storage medium storing a game program according to claim 17, wherein said predetermined state includes a situation in which a next player's turn is being to come.

19. The storage medium storing a game program according to claim 17, wherein said predetermined state includes a situation in which a next player's turn has come.

* * * * *